United States Patent
Harel et al.

(10) Patent No.: US 7,620,447 B2
(45) Date of Patent: Nov. 17, 2009

(54) METHOD FOR ASSESSING THE CONTRACTION SYNCHRONIZATION OF A HEART

(75) Inventors: François Harel, Montreal (CA); Vincent Finnerty, Montreal (CA)

(73) Assignee: Institut de cardiologie de Montreal, Montreal, Quebec (CA)

( * ) Notice: Subject to any disclaimer, the term of this patent is extended or adjusted under 35 U.S.C. 154(b) by 315 days.

(21) Appl. No.: 11/806,283

(22) Filed: May 31, 2007

(65) Prior Publication Data

US 2007/0232943 A1    Oct. 4, 2007

Related U.S. Application Data

(63) Continuation-in-part of application No. 11/052,077, filed on Feb. 8, 2005, now Pat. No. 7,430,309.

(60) Provisional application No. 60/809,335, filed on May 31, 2006.

(51) Int. Cl.
*G06K 9/00*    (2006.01)

(52) U.S. Cl. ............ 600/510; 600/508; 600/509; 600/523; 382/128

(58) Field of Classification Search ......... 600/508–510, 600/523, 450, 416, 512; 382/128–134
See application file for complete search history.

*Primary Examiner*—Quang D Thanh
*Assistant Examiner*—Paula J Stice

(57) ABSTRACT

A method for assessing the contraction synchronization of a heart of a patient using a set of tridimensional images of the heart, the heart having a contraction cycle, the set of tridimensional images including tridimensional images of the heart acquired at successive phases in the contraction cycle, the heart defining a cardiac chamber, the cardiac chamber defining a chamber surface, the method comprising: segmenting the sequence of tridimensional images to extract a model of an evolution over time of the configuration of the chamber surface; computing a synchronization index for the cardiac chamber using the model of the evolution over time of the configuration of the chamber surface, the synchronization index being indicative of the contraction synchronization of the movements of the chamber surface during the contraction cycle; and assessing the contraction synchronization of the heart based on the contraction index.

13 Claims, 12 Drawing Sheets

METHOD FOR ASSESSING THE CONTRACTION SYNCHRONIZATION OF A HEART

This application claims priority from and is a continuation-in-part of U.S. patent application Ser. No. 11/052,077, filed on Feb. 8, 2005 now U.S. Pat. No. 7,430,309. This application further claims the benefit of U.S. Provisional Patent Application Ser. No. 60/809,335, filed on May 31, 2006. These U.S. Patent Applications are hereby incorporated by reference in their entirety.

FIELD OF THE INVENTION

The present invention relates to the art of tomography data sets processing. More specifically, the present invention is concerned with a method for assessing the contraction synchronization of a heart.

BACKGROUND OF THE INVENTION

Many geometric parameters related to cardiac chambers of a patient are of interest to clinicians. Specific examples of such geometric parameters include surface coordinates and cavity volume at specific moments in the cardiac cycle, ejection fraction and phase differences between data relating to two distinct cardiac chambers or to different parts of a specific cardiac chamber, among others. Many of these parameters can be estimated further to the computation of a suitable model of a surface of one or more cardiac chambers. Typically, the model includes a plurality of surface coordinate tri-dimensional vectors.

While the present document refers to cardiac chambers of a patient, it is to be understood that the patient is not necessarily a human suffering from a pathology or from symptoms of a pathology. For example, the patient could be a normal non-pathologic human subject undergoing a preventive diagnostic procedure, an athlete undergoing a study aiming to improve athletic performance, a human subject participating in a research protocol or an animal, among others. However, for brevity, it will be assumed herein after that the patient is a human subject who is not necessarily, but who may be, suffering from a pathology.

A specific example of a prior art method for computing a model of the surface of a cardiac chamber involves the segmentation of a cardiac tomography data set, the cardiac tomography data set including a plurality of voxels. A voxel is an equivalent of a pixel for multi-dimensional data. Accordingly, a voxel includes an intensity value and a tri-dimensional position vector. An objective of the segmentation process is to delimitate physically significant regions in the cardiac tomography data set. In the case discussed herein, segmentation is directed to the delimitation of a cardiac chamber of interest through the computation of a model of a surface of interest, the surface of interest delimitating the cardiac chamber of interest. Many methods for computing a model of the surface of the cardiac chamber of interest from a cardiac tomography data set have been proposed, but they are mostly unsatisfactory.

In a first prior art method for computing a model of the surface of the cardiac chamber, a user manually identifies regions of interest on bi-dimensional slices in the cardiac tomography data set. The regions of interest are regions on each bi-dimensional slice corresponding to the cardiac chamber of interest. The model of the surface of the cardiac chamber of interest includes voxel coordinates of the voxels peripheral to the voxels selected on each slice. A disadvantage of this method resides in a strong dependency on the user. Accordingly, the models of the surface of the cardiac chamber of interest produced by different users will not be identical and are highly likely to be imprecise.

In a second method for computing a model of the surface of the cardiac chamber, referred to as the Germano-type method and described in detail in Van Kriekinge et al., Automatic quantification of left ventricular ejection fraction from gated blood pool SPECT, Journal of Nuclear Cardiology, 1999, Vol. 6, pp 498-506, an ellipsoid is fitted to voxels from the cardiac tomography data set representative of a cardiac chamber of interest. The cardiac tomography data set is acquired using a single photon emission computed tomography (SPECT) imaging apparatus further to an injection in a patient of a radioactive substance. The general location of the cardiac chamber of interest, and therefore of the voxels used for the fit, can be identified in the cardiac tomography data set by a user or through the use of heuristic methods, among others. Subsequently, a plurality of biopsy data sets are computed. Each biopsy data set includes a plurality of data points and is representative of a plurality of voxels oriented in a direction of a respective ray originating at a centre of the ellipsoid. Each biopsy data set is numerically differentiated once and twice to provide respective first and second derivatives data sets. Then, a complex algorithm is used to fit a surface to candidate surface points computed from the first derivative data set. Since it has been shown that the surface of the cardiac chamber is located on a given profile at a location close to a minimum of the first derivative data set, each candidate data points is located at a minimum of a respective first derivative data set. Subsequently, the fitting procedure is used to fit a surface to the candidate data points, each candidate data point having a weight depending on a local maximum of the second derivative data set. Further details regarding the fitting procedure can be found in the above-referenced article by Van Kriekinge et al.

The Germano-type method presents two major deficiencies. First, since the ventricle is not an ellipsoid, some rays will not be perpendicular to the real surface of the cavity to model. Therefore, uncertainties in the exact location of the surface will be introduced in the model of the surface of the cardiac chamber of interest. In addition, since the exact location of the surface is not necessarily at a minimum of the first derivative data set it is very likely that errors are incorporated in the model of the surface of the cardiac chamber of interest.

In conclusion, currently available models of the surface of interest are error-prone due to deficiencies inherent to the segmentation methods currently used. Accordingly, any parameter estimated from these models will also be erroneous. Therefore, there is a need in the industry to provide novel methods and apparatuses to compute a geometric parameter of a cardiac chamber from a cardiac tomography data set.

In addition, a clinician might be interested in gaining information related to a synchronization of contraction between different portions of a heart. For example, a criterion used currently by clinicians to indicate a lack of synchronization between a contraction of a left ventricle and a contraction of a right ventricle is the presence of a widened QRS complex in an electrocardiogram. However, many other causes of such a widened QRS complex exist, which makes this criterion non-specific.

In another example, there are many existing methods for characterizing the synchronization of a single cardiac chamber. Over the past 5 years, several large-scale clinical trials have demonstrated salutary effects of cardiac resynchronization therapy (CRT) in selected patient populations,[1-4] spawning an interest in refining techniques to assess ventricular dyssynchrony. These have encompassed various types of analyses using radionuclide ventriculography, including a dispersion index derived from planar phase imaging (sdΦ). However, these analyses typically use planar phase imaging and are therefore likely to miss important effects due to the tridimensional nature of the heart.

Accordingly, there is a need in the industry to provide novel methods and apparatuses to measure a synchronization of contraction between different portions of a heart, and to measure the overall synchronization during the contraction cycle of a portion of the heart. An object of the present invention is therefore to provide an improved method for assessing the contraction synchronization of a heart.

The present description refers to a number of documents, the content of which is herein incorporated by reference in their entirety.

SUMMARY OF THE INVENTION

In a first broad aspect, the invention provides a method for extracting a geometric parameter from a cardiac tomography data set. The method includes the steps of:
  providing a cardiac tomography data set including a plurality of voxels, each voxel including a respective tri-dimensional position vector and a respective intensity value;
  providing a region of interest including a plurality of voxels selected from the cardiac tomography data set, the region of interest including at least in part voxels from the cardiac tomography data set representative of a cardiac chamber of interest, the cardiac chamber of interest having a surface of interest;
  computing an approximative model of the surface of interest on a basis of the region of interest using a non-parametric method, the approximative model of the surface of interest including a plurality of surface coordinates tri-dimensional vectors;
  computing a plurality of normal vectors, each normal vector being associated with a respective surface coordinate from the approximative model of the surface of interest;
  computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector;
  computing an exact model of the surface of interest on a basis of the plurality of biopsy data sets, the exact model of the surface of interest including a plurality of surface coordinates tri-dimensional vectors, the exact model of the surface of interest being computed by expanding locally the approximative model of the surface of interest in directions defined by the plurality of normal vectors; and
  computing the geometric parameter on a basis of at least one surface coordinate from the plurality of surface coordinates included in the exact model of the surface of interest.

Voxels represent data acquired by a tomography imaging apparatus. Each voxel includes a tri-dimensional position vector and an intensity value. In a specific example of implementation, the tri-dimensional position vector is implicit in the form of three indices related to a position in a multi-dimensional table. In a further specific example of implementation, the tri-dimensional position vector is explicit in the form of a list of three numbers. The intensity value represents a measurement taken by the tomography imaging apparatus in a volume corresponding to a location in a patient associated with the tri-dimensional position vector. It is to be understood that the intensity value is not necessarily an intensity in the physical meaning of the term and can represent any parameter measured by the tomography imaging apparatus. For example, and non-limitatively, the intensity value might be representative of a phase measured by a magnetic resonance imaging apparatus. In some embodiments of the invention, the voxel includes a time data. The time data is indicative of a time at which the measurement has been taken by the tomography imaging apparatus. In a specific example of implementation, the time data is indicative of a phase or a time in a cardiac cycle. The time data may be explicit in the form of a number or implicit in the form of an index in a multi-dimensional table.

The region of interest is selected manually by a user or through an automated procedure. The region of interest serves as a seed for computing an approximative model of the surface of interest. The surface of interest is the surface of a cardiac chamber, such as, for example, the surface of a ventricle or an auricle.

In a specific example of implementation, the step of computing an exact model of the surface of interest on a basis of the plurality of biopsy data sets by expanding locally the approximative model of the surface of interest in directions defined by the plurality of normal vectors includes expanding locally the approximative model of the surface of interest until an optimization criterion is satisfied.

A very specific and non-limiting example of such an optimization criterion in a multiresolution laplacian variance minimization. When the multiresolution laplacian variance minimization is used, each of the biopsy data set is representative the variance of a multiresolution laplacian data set at a plurality of voxels oriented in a direction defined by a respective normal vector selected from the plurality of normal vectors and including the surface coordinate associated with the respective normal vector. The exact model of the portion of the surface of interest includes a plurality of surface coordinates tri-dimensional vectors at which the variance of the multiresolution laplacian data set is substantially minimal.

The geometric parameter computed on a basis of at least one surface coordinate from the plurality of surface coordinates included in the exact model of the surface of interest is a parameter related to one or more cardiac chambers of interest. Specific examples of geometric parameters include, but are not limited to, surface coordinates and cavity volume at specific moments in the cardiac cycle, ejection fraction and phase difference between data relating to two distinct cardiac chambers or to different parts of a unique cardiac chamber.

In another broad aspect, the invention provides a computer readable storage medium containing a program element for execution by a computing device. The program element is operative for extracting a geometric parameter from a cardiac tomography data set.

In some embodiments of the invention, a method for computing a Fourier coefficient indicative of a degree of synchronization between contractions of two different portions of a heart is implemented. The Fourier coefficient is obtained through a Fourier analysis applied to a geometric parameter extracted from a cardiac tomography data set. The Fourier coefficient includes one or more components selected from of a phase, an amplitude or a power.

In some embodiments of the invention, the invention implements a method for classifying patients as good or bad candidates for the implantation of a bi-electrode pacemaker. A bi-electrode pacemaker includes two electrodes implanted in two different portions of a heart. In a specific example of implementation, a good candidate for the implantation of a bi-electrode pacemaker suffers from a pathologic lack of synchronization in a contraction of a left and a right ventricle. In a very specific example of implementation, a good candidate for the implantation of a bi-electrode pacemaker experiences a phase difference in the contraction of the left and the right ventricles larger than a predetermined phase. The phase difference in the contraction of the left and the right ventricles can be computed from a Fourier analysis of an exact model of surfaces of the right and left ventricles.

The invention further provides a method for adjusting a delay between a stimulation of a left and a right ventricle by a bi-electrode pacemaker implanted in a patient. One electrode stimulates the left ventricle and another electrode stimulates the right ventricle. The delay is adjusted to restore a synchronization between a contraction of the right and the left ventricles. The synchronization between the contraction of the right and left ventricles can be evaluated through the computation of an exact model of the right and left ventricles from a cardiac tomography data set. In a specific example of implementation, the delay is gradually modified until the synchronization between the contraction of the right and left ventricles are satisfactory.

The invention further provides a method for performing a segmentation of a multi-dimensional data set. The method includes steps of:

providing a multi-dimensional data set including a plurality of voxels, each voxel including a respective multi-dimensional position vector and a respective intensity value;

providing a region of interest including a plurality of voxels selected from the multi-dimensional data set, the region of interest defining a surface of interest;

computing an approximative model of the surface of interest on a basis of the region of interest using a non-parametric method, the approximative model of the surface of interest including a plurality of surface coordinates multi-dimensional vectors;

computing a plurality of normal vectors, each normal vector being associated with a respective surface coordinate from the approximative model of the surface of interest;

computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector, computing a plurality of biopsy data sets including computing a multiresolution laplacian data set from the multi-dimensional data set, each of the biopsy data set being representative of the variance of the multiresolution laplacian data set at a plurality of voxels oriented in a direction defined by a respective normal vector selected from the plurality of normal vectors and including the surface coordinate associated with the respective normal vector; and computing an exact model of at least a portion of the surface of interest on a basis of the plurality of biopsy data sets, the exact model of the portion of the surface of interest including a plurality of surface coordinates multi-dimensional vectors, the exact model of the portion of the surface of interest being computed by expanding locally the approximative model of the surface of interest in directions defined by the plurality of normal vectors, the exact model of the portion of the surface of interest including a plurality of surface coordinates multi-dimensional vectors at which the variance of the multiresolution laplacian data set is substantially minimal.

In another broad aspect, the invention provides a method for assessing the contraction synchronization of a heart of a patient using a set of tridimensional images of the heart, the heart having a contraction cycle, the set of tridimensional images including tridimensional images of the heart acquired at successive phases in the contraction cycle, the heart defining a cardiac chamber, the cardiac chamber defining a chamber surface, the method comprising:

segmenting the sequence of tridimensional images to extract a model of an evolution over time of the configuration of the chamber surface, computing a synchronization index for the cardiac chamber using the model of the evolution over time of the configuration of the chamber surface, the synchronization index being indicative of the contraction synchronization of the movements of the chamber surface during the contraction cycle; and assessing the contraction synchronization of the heart based on the contraction index.

An example of this method was implemented as follows. A novel 3D gated blood-pool Single Photon Emission Computed Tomography (SPECT) approach was used, from which a contraction homogeneity index (CHI) was derived and compared to planar phase analyses.

Method. Subjects underwent planar and SPECT blood-pool acquisition. Planar images were processed for left ventricular ejection fraction (LVEF) computation and phase values. SPECT images were processed by the above-described segmentation method, and the CHI was computed.

Results. Overall, 235 patients (79% male; mean age 62±11 years) completed the study. LVEFs were similar by planar (33.5±13.5%) and 3D (34.7±12.7%) methods (r=0.83, P<0.0001). Mean phase angles for planar and tomographic methods were 126.3±29.6° and 124.4±28.7°, respectively (r=0.53; P<0.0001). Phase and amplitude signals were incorporated in the CHI, which was non-normally distributed with a median of 85.9% (IQR 77.7%, 92.2%). This index minimized the negative impact of dyskinetic wall segments with limited regional motion. The planar heterogeneity index (sdΦ) was 28.2° (IQR 17.5°, 46.8°) and correlated inversely with CHI (r=−0.61, P<0.0001).

The novel 3D dispersion index, CHI, accounts for both phase delay of a dyssynchronous segment and its magnitude of contraction, and is moderately correlated with planar phase analyses. Its potential in cardiac resynchronization therapy is promising as it likely better represent the overall contraction synchronization of the left ventricle than existing synchronization evaluation methods.

In yet another broad aspect, the invention provides a device for assessing the contraction synchronization of a heart of a patient.

In another broad aspect, the invention provides a method for assessing an improvement in performance of a multi-electrode pacemaker, the multi-electrode pacemaker including at least two electrodes implanted in a heart of a patient, each of the electrode being activatable at a respective time in a cardiac cycle, the heart defining a cardiac chamber, the method comprising:

setting respective first activation times for each of the electrodes;

acquiring a first set of tridimensional images of the heart, the first set of tridimensional images including tridimensional images of the heart acquired at successive phases in the contraction cycle;

computing a first synchronization index;

setting respective second activation times for each of the electrodes;

acquiring a second set of tridimensional images of the heart, the second set of tridimensional images including tridimensional images of the heart acquired at successive phases in the contraction cycle;

computing a second synchronization index; and assessing the improvement in the performance of the multi-electrode pacemaker on a basis of the first and second synchronization indices.

In yet another broad aspect, the invention provides a device for changing electrode activation times in a multi-electrode pacemaker, for example based on an assessment of the contraction synchronization of the heart of a patient.

Other objects, advantages and features of the present invention will become more apparent upon reading of the following non-restrictive description of preferred embodiments thereof, given by way of example only with reference to the accompanying drawings.

DETAILED DESCRIPTION

The invention relates to a method for extracting a geometric parameter from a multi-dimensional data set. A non-limiting example of such a data set is a tri-dimensional cardiac tomography data set. In this example, the method includes providing a cardiac tomography data set and a region of interest, computing an approximative model of a surface of interest, computing a plurality of normal vectors associated with a respective surface coordinate from the approximative model of the surface of interest, computing a plurality of biopsy data sets, each biopsy data set being oriented along a respective normal vector from the plurality of normal vectors, computing an exact model of the surface of interest from the plurality of biopsy data sets, and computing the geometric parameter on a basis of the exact model of the surface of interest.

The approximative model serves as a seed for the computation of the exact model and takes into account the geometry of the cardiac chamber so that local deformations of the approximative model lead to the exact model. The exact model is automatically computed so as to satisfy an optimization criterion. Then, the exact model is used to compute the geometric parameter.

In an embodiment of the invention, the geometric parameter provides a classification criterion for classifying patients as good or bad candidates for the implantation of a bi-electrode pacemaker. The geometric parameter is also usable for adjusting a delay between a stimulation of a left and a right ventricle by the bi-electrode pacemaker implanted in a patient. However, in other embodiments of the invention, the geometric parameter is used in any other suitable manner.

More generally, the multi-dimensional data set is any suitable data set within which a surface of interest is sought through segmentation. The number of dimensions of the data set is any suitable number of dimensions, such as two dimensions and three dimensions, among others. For example, the multi-dimensional data set is a medical imaging data set representative of a subject within which a surface of an organ or of a portion of an organ is sought. However, it is within the scope of the invention to have any other suitable multi-dimensional data set.

The method is described herein below with respect to non-limiting example wherein the multi-dimensional data set includes a tri-dimensional cardiac tomography data set. However, the use of this specific example is selected to help understand the method in the context of a specific application and should not be used to restrict the scope of the appended claims.

Figure 1:
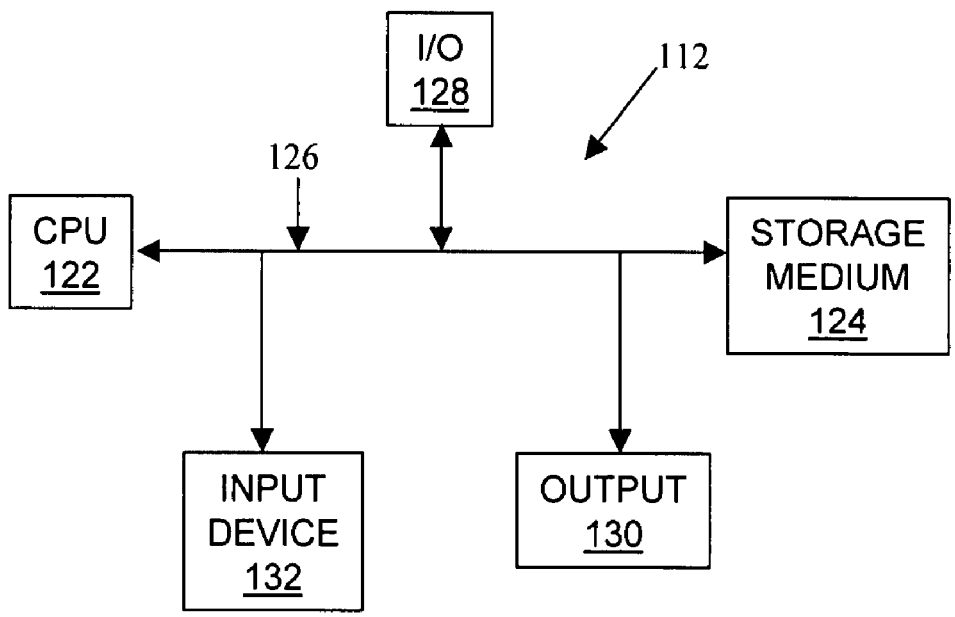
FIG. 1 is a block diagram of an apparatus for computing a geometric parameter from a cardiac tomography data set.

FIG. 1 is a block diagram of an apparatus for computing a geometric parameter from a cardiac tomography data set in the form of a computing device 112. The computing device 112 includes a Central Processing Unit (CPU) 122 connected to a storage medium 124 over a data bus 126. Although the storage medium 124 is shown as a single block, it may include a plurality of separate components, such as a floppy disk drive, a fixed disk, a tape drive and a Random Access Memory (RAM), among others. The computing device 112 also includes an Input/Output (I/O) interface 128 that connects to the data bus 126. The computing device 112 communicates with outside entities through the I/O interface 128. In a non-limiting example of implementation, the I/O interface 128 is a network interface. In a further non-limiting example of implementation, the I/O interface is a port for exchanging electrical signals with a cardiac tomography imaging apparatus.

The computing device 112 also includes an output device 130 to communicate information to a user. In the example shown, the output device 130 includes a display. Optionally, the output device 130 includes a printer or a loudspeaker, among other suitable output device components. The computing device 112 further includes an input device 132 through which the user may input data or control the operation of a program element executed by the CPU 122. The input device 132 may include, for example, any one or a combination of the following: keyboard, pointing device, touch sensitive surface or speech recognition unit, among others.

When the computing device 112 is in use, the storage medium 124 holds a program element 200 (see FIG. 2) executed by the CPU 122, the program element 200 implementing a method for extracting a geometric parameter from a cardiac tomography data set.

Figure 2:
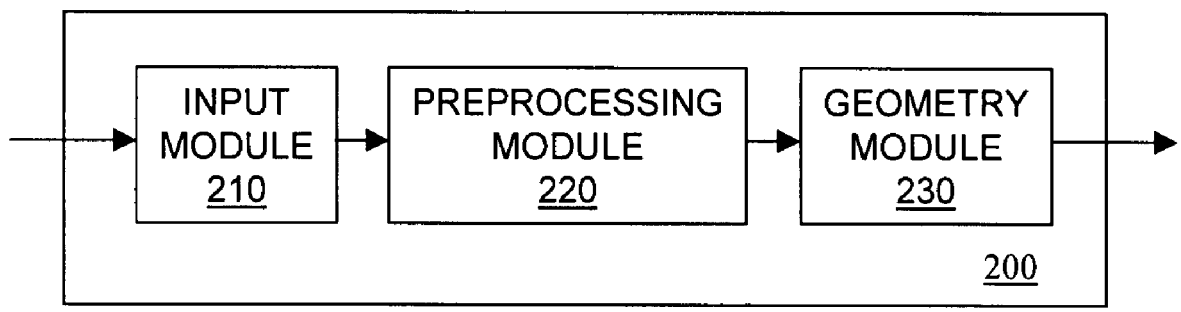
FIG. 2 is a block diagram of a specific example of implementation of a program element executed on the apparatus of FIG. 1.

FIG. 2 illustrates in block diagram form a specific example of implementation of the program element 200. The program element 200 includes an input module 210, a preprocessing module 220 and a geometry module 230. Arrows in FIG. 2 illustrate the flow of information in the program element 200. The input module 210 accepts data in the form of a cardiac tomography data set and a region of interest. The input module then transmits the cardiac tomography data set and the region of interest to the preprocessing module 220, which computes an exact model of a surface of a cardiac chamber of interest. The exact model of the surface of the cardiac chamber of interest is then transmitted to the geometry module 230. The geometry module 230 computes and releases a geometric parameter, which is a one-dimensional or a multi-dimensional geometric parameter.

The input module 210 is provided for receiving a cardiac tomography data set and a region of interest. The cardiac tomography data set includes a plurality of voxels, each voxel including a respective tri-dimensional position vector and a respective intensity value. In some embodiments of the invention, each voxel includes also a time data, such as a time stamp. The region of interest includes a plurality of voxels selected from the cardiac tomography data set. Specifically, the region of interest includes at least in part voxels from the cardiac tomography data set representative of a cardiac chamber of interest, the cardiac chamber of interest having a surface of interest.

In a very specific example of implementation, the cardiac tomography data set is acquired by an imaging apparatus and transferred to the input module 210 through the I/O interface 128, which is in a data communication relationship with the imaging apparatus. Alternatively, the cardiac tomography data set is contained in the storage medium 124 and recovered therefrom by the input module 210.

Examples of an imaging apparatus suitable for providing the cardiac tomography data are: a single photon emission tomography (SPECT) apparatus; a positron emission tomography (PET) apparatus; a tridimensional echography apparatus, a tridimensional Doppler ultrasound apparatus; a tridimensional angiography apparatus; an electron beam computed tomography apparatus; an electrical impedance tomography apparatus; and a magnetic resonance imaging (MRI) scanner. In many instances, but not necessarily, the imaging apparatus performs an averaging procedure and the data used for producing the cardiac tomography data set is acquired over many cardiac cycles, for example to improve a signal-to-noise ratio. Therefore, in these instances, data acquisition needs to be synchronized by the imaging apparatus with electrocardiographic data. A method for acquiring such a type of cardiac tomography data is described in more details in U.S. Pat. No. 6,389,310 issued to Demonceau et al., but other suitable methods are also usable in conjunction with the invention.

The region of interest includes a plurality of voxels selected from the cardiac tomography data set. For example, the region of interest might be selected manually by a user through the input device 132. In a very specific example of implementation, the user is presented with a plurality of slices from the cardiac tomography data set, each slice including voxels located in a common plane. The user then operates a pointing device to define a portion of the region of interest on each slice. If the user is not presented with contiguous slices in the cardiac tomography data set, an optional interpolation algorithm might be executed by the input module 210 to provide the region of interest.

In another example, the region of interest is selected at least in part automatically by the input module 210. For instance, a known cardiac cavity identification method, such as for example a watershed-based method, may be used to identify the cardiac chamber within the cardiac tomography data set and includes within the region of interest all the voxels representing the cardiac chamber of interest.

In some embodiments of the invention, providing a cardiac tomography data set includes performing a coordinate system standardisation wherein the tri-dimensional position vector of each voxel is mapped to a standardised coordinate system. For example, the coordinate system standardisation is performed at least on a basis of a detection of a plane separating the ventricles from the atriums in the cardiac tomography data set. Therefore, in the standardised coordinate system, this plane is positioned to include an origin of the standardised coordinate system or in any other suitable coordinate system.

Figure 3:
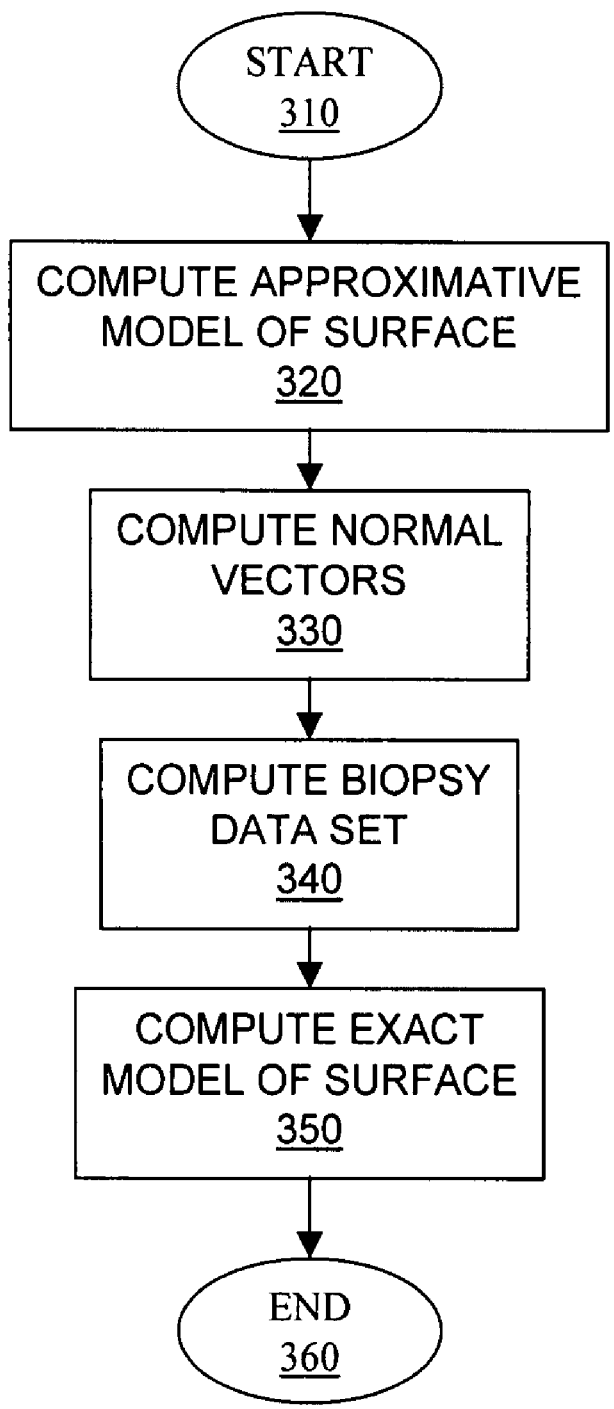
FIG. 3 is a flowchart illustrating a preprocessing method performed by a preprocessing module included in the program element of FIG. 2.

The preprocessing module 220 implements a preprocessing method for computing an exact model of the surface of interest. A specific example of implementation of the preprocessing method 300 is illustrated in FIG. 3.

At step 310, the preprocessing method begins. Subsequently, at step 320, the preprocessing module 220 computes an approximative model of the surface of interest. At step 330, the preprocessing module 220 computes a plurality of normal vectors associated with the approximative surface. The plurality of normal vectors defines a plurality of directions along which a plurality of biopsy data sets is computed at step 340. Finally, at step 350 an exact model of the surface of interest is computed on a basis of the plurality of biopsy data sets and the method ends at step 360.

The approximative model of the surface of interest computed at step 320 includes a plurality of surface coordinates, each being a tri-dimensional vector. The approximative model approximates the surface of interest and is computed on a basis of the region of interest using a non-parametric method. Non-parametric methods, in opposition to parametric methods, do not approximate the cardiac chamber by a simple geometric shape defined by a few parameters. For example, a parametric method could approximate a left ventricle by an ellipsoid, the ellipsoid being characterized by a centre and three principal axis dimensions and orientations.

In a specific example of implementation, the approximative model is obtained by continuously deforming the region of interest until the approximative model of the surface of interest surrounds a largest set of voxels having an intensity above a predetermined threshold. In other words, in this case the approximative model includes an isosurface.

An example of a predetermined threshold is a predetermined fraction of the maximal intensity of all the voxels contained within the region of interest. For example, the predetermined fraction of the maximal intensity is from about 0.2 times the maximal intensity to about 0.5 times the maximal intensity. In a specific example, the predetermined fraction of the maximal intensity is about 0.4 times the maximal intensity.

Another example of a threshold is a threshold that is modified by the user until a visual inspection of the approximative model is satisfactory. In yet another example, the threshold is a predetermined absolute value.

Optionally, a filter is applied to the cardiac tomography data set prior to the computation of the approximative model. Alternatively, and also optionally, a filter is applied to the approximative model to mitigate the effects of random variations inherent to the cardiac tomography data set acquisition process. Such filters are well known in the art and will therefore not be described in further details.

As mentioned herein above, the preprocessing module 220 computes at step 330 a plurality of normal vectors. Each normal vector is associated with a respective surface coordinate from the approximative model of the surface of interest. The plurality of normal vectors defines a plurality of directions locally perpendicular to the approximative model of the surface of interest.

The plurality of normal vectors is used at step 340 to compute a plurality of biopsy data sets, each biopsy data set including a plurality of data points. Each biopsy data set is representative of a plurality of voxels oriented in a direction defined by a respective normal vector selected from the plurality of normal vectors and including the surface coordinates associated with the respective normal vector.

In a specific example of implementation, each biopsy data set is computed as follows. First, a cylinder including a certain surface coordinate of the approximative surface model and oriented in the direction of the normal vector associated with the certain surface coordinate is built. As the reader skilled in the art will appreciate, the radius of the cylinder is selected on a basis of many factors, including but not limited to the resolution of the cardiac tomography data set and the noise level in the cardiac tomography data set. The cylinder includes a plurality of cylinder slices, each cylinder slice being associated with a respective data point included in the biopsy data set. The value of each data point is an average value of all the voxels contained within each associated cylinder slice.

In a further specific example of implementation, each biopsy data set is computed as follows. First, a line segment including a certain surface coordinate of the approximative surface model and oriented in the direction of the normal vector associated with the certain surface coordinate is built. The segment includes a plurality of data locations, each data location being associated with a respective data point included in the biopsy data set. The value of each data point is obtained by interpolating the cardiac tomography data set at each data location using any of the many methods for interpolating a data set known in the art.

In yet another specific example of implementation, each biopsy data set is computed using a transformed data set obtained by applying a data transform the cardiac tomography data set. Then, any suitable method, such as for example methods similar to the above-described methods, is used to compute a biopsy data set from the transformed data set.

The computing of an exact model of the surface of interest on a basis of the plurality of biopsy data sets is performed at step 340, as described hereinbelow. The exact model of the surface of interest includes a plurality of surface coordinate tri-dimensional vectors and is representative of the surface of interest. The exact model of the surface of interest is computed by expanding locally the approximative model of the surface of interest in directions defined by the plurality of normal vectors.

In an example of implementation, the biopsy data sets are computed from a transformed data set obtained by computing a laplacian of the cardiac tomography data set. In this example, the exact model of the surface of interest includes a plurality of surface coordinates tri-dimensional vectors at which the laplacian of the cardiac tomography data set is substantially equal to zero. In some embodiments of the invention, the laplacian is a tridimensional laplacian.

In a related example of implementation, the biopsy data sets are computed from a transformed data set including a multiresolution data set from obtained from the cardiac tomography data set. The biopsy data sets are computed from a multiresolution laplacian data set obtained from said cardiac tomography data set by computing a plurality of laplacians of the cardiac tomography data set each taken at a predetermined resolution. In some embodiments of the invention, the laplacian is a tridimensional laplacian.

Then, in a specific embodiment of the invention, each of the biopsy data sets is representative the variance of the multiresolution laplacian data set at a plurality of voxels oriented in a direction defined by a respective normal vector selected from the plurality of normal vectors and including the surface coordinates associated with the respective normal vector.

An example of an optimisation criterion that may be used with the biopsy data sets computed using the method outlined in the preceding paragraph is a minimisation of the variance of the multiresolution laplacian data set. In other words, the exact model of the surface of interest includes a plurality of surface coordinates tri-dimensional vectors at which the variance of the multiresolution laplacian data set is substantially minimal.

The number of resolutions used in this method depends on the exact nature of the cardiac tomography data set and is generally comprised between 2 and 6. However, it is within the scope of the claimed invention use any other suitable number of resolutions. Also, the resolutions used for a specific cardiac tomography data set depend on many factors, such as the imaging apparatus used to acquire the data set, image acquisition parameters and pre-filtering performed by the imaging apparatus, among others. The reader skilled in the art will readily appreciate how to select the number and values of the resolutions according to the processed cardiac tomography data set.

While the above-described examples refer to the surface of interest that itself encloses a volume of interest, the reader skilled in the art will readily appreciate that at least some of these methods are also suitable to compute only a portion of the surface of interest.

In yet another example of implementation, the cardiac tomography data set includes a plurality of voxels, each voxel including a respective tri-dimensional position, a respective time stamp and a respective intensity value. Then, the steps of providing a region of interest including a plurality of voxels selected from the cardiac tomography data set; computing an approximative model of the surface of interest on a basis of the region of interest using a non-parametric method; computing a plurality of normal vectors; computing a plurality of biopsy data sets; and computing an exact model of the surface of interest on a basis of the plurality of biopsy data sets are performed for a plurality of simultaneously acquired sets of voxels, each of the simultaneously acquired sets of voxels including all the voxels from the cardiac tomography data set having a substantially identical time stamp. Computing an exact model of the surface of interest produces a plurality of simultaneous models of the surface of interest, each simultaneous model of the surface of interest being an exact model of the surface of interest computed from a respective simultaneously acquired set of voxels.

In yet another specific example of implementation, the local expansion of the approximative model of the surface of interest is performed using a gradient method, such as a modified local Germano-type method, similar to the Germano-type method described in Van Kriekinge et al., cited previously. As mentioned hereinabove, in the Germano-type method, each biopsy data set is numerically differentiated once and twice to provide respective first and second derivatives data sets. Similarly, in the modified local Germano-type method, each biopsy data set is numerically differentiated once and twice to provide respective first and second derivatives data sets. The surface of the cardiac chamber of interest is located on a given profile at a location close to a minimum of the first derivative data set. However, in opposition to the Germano-type method, the modified Germano-type method uses biopsy data sets obtained from voxels locally perpendicular to the surface of the cavity of interest. Since methods for identifying suitable minima in derivative data sets used by Germano-type methods are well known in the art, they will not be detailed herein.

In a very specific example of implementation, the exact model of the surface of interest is computed as follows from the minima of the first derivative data sets and subsequent local maxima of the second derivative data sets. A parameter referred to as alpha is used. Alpha represents a normalized linear interpolation of a position and is common to all the first and second derivative data sets. More specifically, alpha takes a value of zero at all the minima of the first derivative data sets and a value of one at all the subsequent local maxima of the second derivative data sets. Intermediate values of alpha are obtained by linear interpolation such that, for example, a point located at midpoint between the minimum of a certain first derivative data sets and a subsequent local maximums of the second derivative data sets derived from the certain first derivative data set is designed by a value of alpha of one half.

To compute the exact model of the surface of interest, the value of alpha is adjusted globally for all the biopsy data sets to satisfy a consistency criterion. In a very specific example of implementation, alpha is selected such that a count-based evaluation of an ejection fraction related to the cavity of interest assumes a predetermined relationship with a voxel-based evaluation of an ejection fraction related to the cavity of interest. In other words, alpha is varied until the ejection fraction evaluated from the exact modelled surface and computed using two different methods satisfies the predetermined relationship. For example, the predetermined relationship might be that the voxel-based ejection fraction evaluation is a predetermined fraction of count-based ejection fraction evaluation. The fraction can assume a unity value, among others The geometry module 230 computes and outputs to the output 130 the geometric parameter. The geometric parameter is computed on a basis of at least one surface coordinate from the plurality of surface coordinates included in the exact model of the surface of interest.

Many geometric parameters are computable from the model of the surface of interest. For example, a volume of the cardiac chamber of interest can be computed by evaluating the volume contained within the model of the surface of interest. Algorithms to that effect are well known in the art and will therefore not be described in further details. If the volume of the cardiac chamber corresponding to an end of a systole and the volume of the cardiac chamber corresponding to an end of a diastole are known, an ejection fraction can be computed, once again using well-known methods. For these two parameters, a single output needs to be outputted.

In another example of implementation, the geometric parameter of interest is the model of the surface of interest itself. In these cases, the geometric module 230 can release either data to be visualized on a monitor in the output 130 or a plurality of surface coordinates to be saved on the storage medium 124 for future use.

In a further specific example of implementation, the geometric parameter includes a frequency analysis diagram, such as a Fourier analysis diagram, a discrete cosine transform (DCT) analysis diagram or a wavelet transform analysis diagram. In a very specific example of implementation, the geometric parameter includes a phase difference between a position on the surface of a first cardiac chamber and the corresponding position on the surface of a second cardiac chamber. In a further very specific example of implementation, the geometric parameter includes a pooled phase difference between positions on the surface of a first cardiac chamber and corresponding positions on the surface of a second cardiac chamber. In a further very specific example of implementation, the geometric parameter includes phase differences between parts of a unique cardiac chamber.

Figure 4:
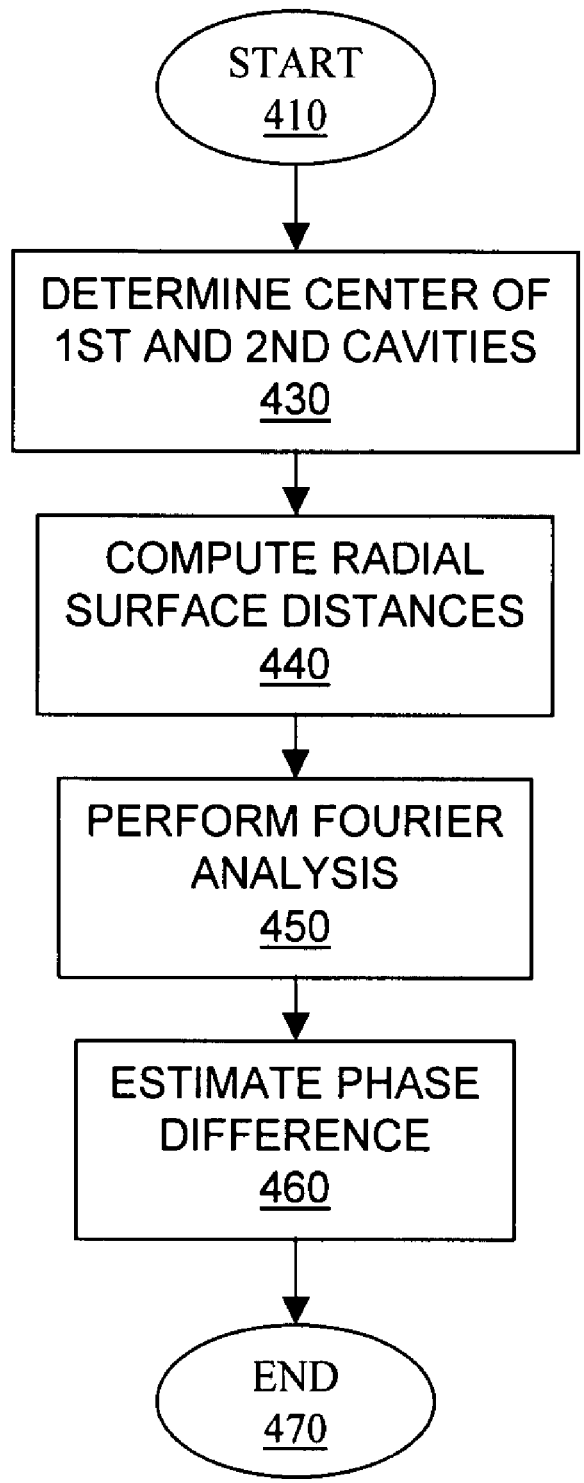
FIG. 4 is a flowchart illustrating a specific example of implementation of a method for performing a Fourier analysis, the Fourier analysis method being performed by a geometry module included in the program element of FIG. 2.

In a specific example of implementation, the method illustrated on FIG. 4 is used to produce a Fourier analysis diagram. The method requires an exact model of the surface of a first cardiac chamber and an exact model of the surface of a second cardiac chamber, each exact model including surface coordinates taken at a plurality of times corresponding to different phases in the cardiac cycle. Therefore, the input module 210 and the preprocessing module 220 process the cardiac tomography data set to obtain two time-dependent exact models.

The method starts at step 410. At step 430, a centre of each cardiac chamber is determined form the two exact models of surfaces of interest for each phase of the cardiac cycle. Subsequently, at step 440, distances between a centre of each exact model of surfaces and a plurality of locations on each exact model of surfaces are computed. At step 450, for each location, a Fourier analysis is performed to obtain a phase and an amplitude of an harmonic. In a very specific example of implementation, only the first harmonic is retained for output. Alternatively, more than one harmonic are retained. For example, retaining three harmonics might give better results in some applications. By pooling the data corresponding to all the locations, at step 460, an estimate in the phase difference in the contraction between the two cardiac chambers can be determined to be outputted by the geometry module 230. The method ends at step 470.

In specific examples of implementation, the Fourier analysis is used for classifying patients as good or bad candidates for the implantation of a bi-electrode pacemaker. Alternatively, the Fourier analysis is used for adjusting a delay between a stimulation of a left and a right ventricle by a bi-electrode pacemaker implanted in a patient. In yet another alternative, the Fourier analysis is used to determine that only one electrode in a bi-electrode pacemaker is required to properly stimulate a heart. For example, a bi-electrode stimulation might not improve a synchronization in the contraction of two cardiac chambers, rendering unnecessary a bi-electrode stimulation.

Cardiac resynchronization therapy (CRT) significantly improves symptoms, exercise tolerance, and quality of life in patients with heart failure. Current indications for CRT include: 1) Reduced ejection fraction (EF) <35% 2) New York Heart Association (NYHA) functional class III or IV and 3) QRS duration >120 ms, which has been used as a marker of mechanical asynchrony. Up to 30% of patients fail to respond to CRT despite meeting accepted criteria, suggesting that electrical asynchrony does not necessarily imply mechanical asynchrony.

Figure 13:
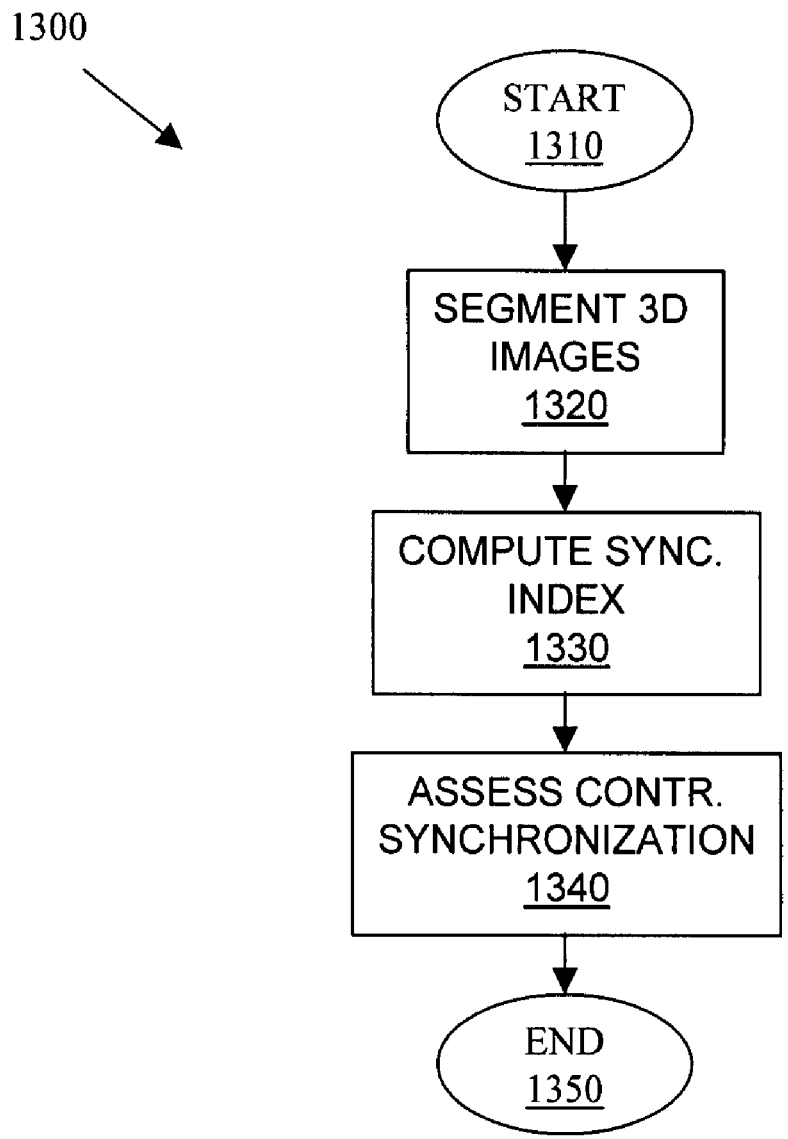
FIG. 13 is a flowchart illustrating a specific example of implementation of a method for assessing the contraction synchronization of a heart, for example as performed by the device of FIG. 11.

A method 1300, illustrated in FIG. 13, for assessing the contraction synchronization of a heart of a patient using a set of tridimensional images of the heart is proposed. The tridimensional images are acquired using any suitable imaging technology, such as for example the imaging technologies mentioned hereinabove. The heart has a contraction cycle, and the set of tridimensional images includes tridimensional images of the heart acquired at successive phases in the contraction cycle. The heart defines a cardiac chamber, the cardiac chamber defining a chamber surface. For example, the method 1300 is implemented in software executed by a computing device similar to the computing device 112. However, the method 1300 may also be implemented in hardware or in a combination of hardware and software.

Generally speaking, the method 1300 starts at step 1310. Then, at step 1320, the sequence of tridimensional images is segmented to extract a model of an evolution over time of the configuration of the chamber surface. Afterwards, at step 1330, a synchronization index for the cardiac chamber is computed using the model of the evolution over time of the configuration of the chamber surface, the synchronization index being indicative of the contraction synchronization of the movements of the chamber surface during the contraction cycle. Finally, at step 1340, the contraction synchronization of the heart is assessed based on the contraction index and the method ends at step 1350.

For example, segmenting the sequence of tridimensional images at step 1320 includes computing a sequence of modelled chamber surfaces from the set of tridimensional images of the heart. The modelled chamber surfaces may be computed using the above-described Germano-type segmentation method, among other possibilities.

In specific embodiments of the invention, computing the synchronization index includes:
  selecting an initial configuration of the cardiac chamber;
  selecting a set of chamber surface locations in the initial configuration of the cardiac chamber;
  computing an evolution over time of the set of chamber surface locations on a basis of the sequence of modelled chamber surfaces to obtain a set of chamber surface time evolutions, each of the chamber surface time evolutions corresponding to a respective chamber surface location from the set of chamber surface locations; and
  computing the synchronization index on a basis of the set of chamber surface time evolutions.

For example, the initial configuration of the cardiac chamber is a modelled chamber surface selected from the sequence of modelled chamber surfaces. The modelled chamber surface may be selected at the systole, at the diastole, at an arbitrary time or according to any other suitable predetermined criterion. In other embodiments, the initial configuration is randomly selected among the modelled chamber surfaces. Also, in some examples, computing the evolution over time of the set of chamber surface locations includes computing the evolution over time of the set of chamber surface locations along a direction substantially perpendicular to the initial configuration of the cardiac chamber for each of the chamber surface location.

In a variant, the synchronization index is proportional to a modulus of an average of the complex first harmonic coefficients of a Fourier transform of the chamber surface time evolutions. In a specific example, the synchronization index is normalized to an average of the moduli of the first harmonic coefficients of the Fourier transform of the chamber surface time evolutions, as described in greater details in the example found hereinbelow.

Figure 11:
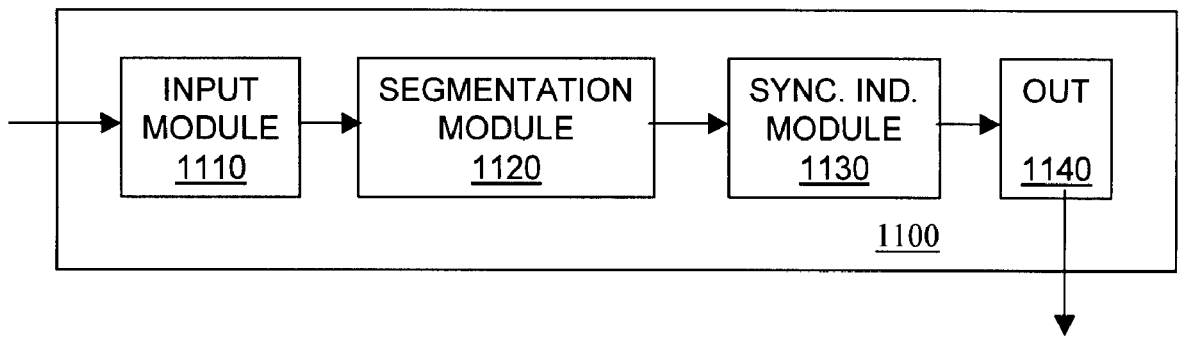
FIG. 11 is a block diagram illustrating a device for assessing the contraction synchronization of a heart.

The method 1300 may be performed using a device 1100, shown in FIG. 11, for assessing the contraction synchronization of a heart of a patient using a set of tridimensional images of the heart. The device 1100 includes an input module 1100 for receiving the set of tridimensional images of the heart, a segmentation module 1120 operatively coupled to the input module 1110 for segmenting the sequence of tridimensional images as described hereinabove and a synchronization index evaluation module 1130 operatively coupled to the segmentation module for computing the synchronization index as described hereinabove. An output module 1140 is operatively coupled to the synchronization index evaluation module 1130 for outputting the contraction index. For example, assessment is performed according to predetermined criteria and may be used to classify the patient in a predetermined category. The predetermined category may be diagnostic categories. In other embodiments, the categories are indicative of the likelihood that the patient will respond to a certain treatment. However, the categories may be any other suitable category providing a clinically or otherwise significant classification.

Figure 14:
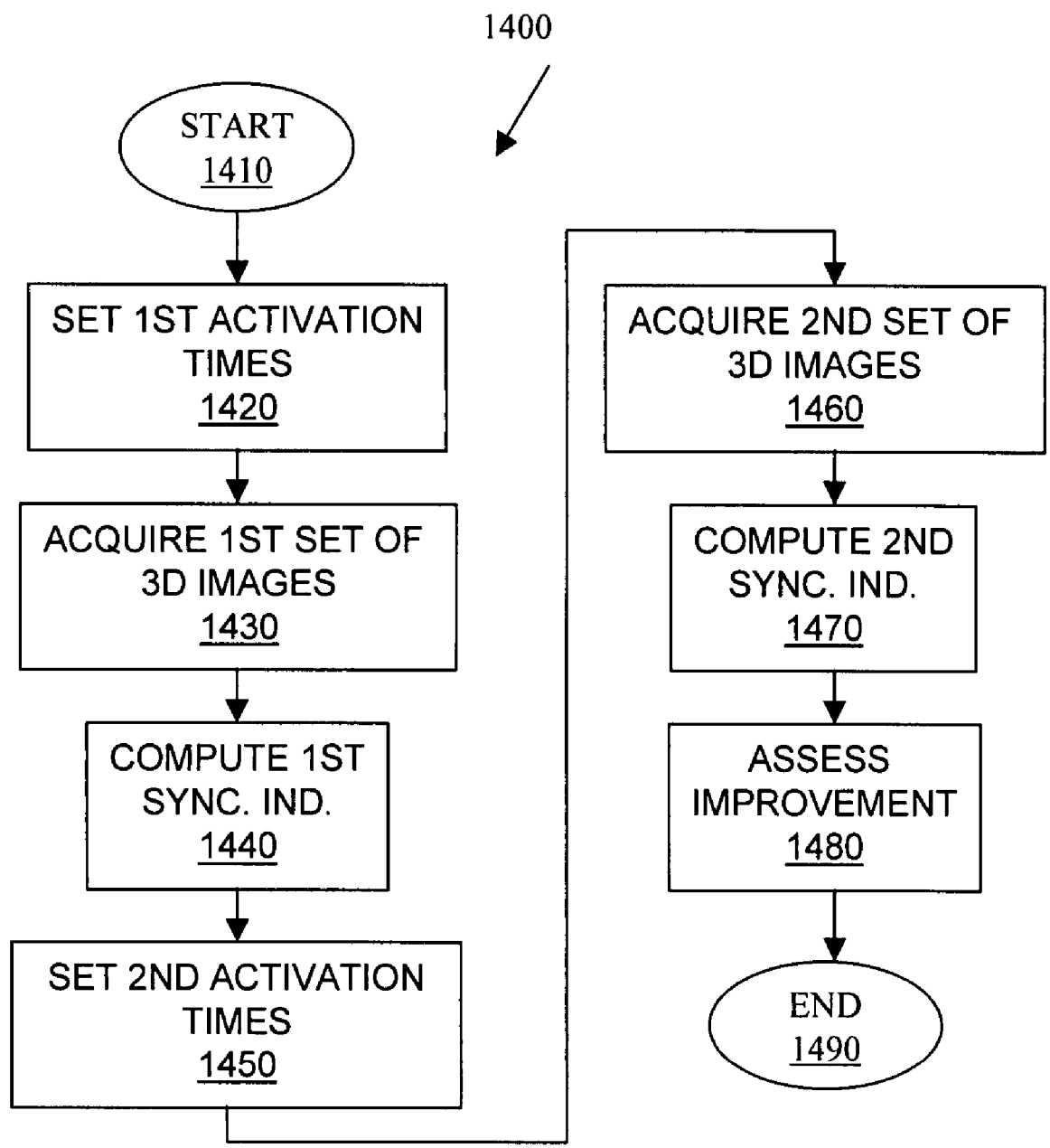
FIG. 14 is a flowchart illustrating a specific example of implementation of a method for assessing an improvement in the contraction synchronization of a heart, for example usable with the device of FIG. 12.

Another application of the above-described method is a method for assessing an improvement in performance of a multi-electrode pacemaker, shown in FIG. 14. In this method, a multi-electrode pacemaker includes at least two electrodes implanted in a heart of a patient, each of the electrodes being activatable at a respective time in a cardiac cycle, the heart defining a cardiac chamber. The method starts at step 1410 and includes:
  setting respective first activation times for each of the electrodes (step 1420)
  acquiring a first set of tridimensional images of the heart, the first set of tridimensional images including tridimensional images of the heart acquired at successive phases in the contraction cycle (step 1430);
  computing a first synchronization index as described hereinabove (step 1440);
  setting respective second activation times for each of the electrodes (step 1450);
  acquiring a second set of tridimensional images of the heart, the second set of tridimensional images including tridimensional images of the heart acquired at successive phases in the contraction cycle (step 1460);
  computing a second synchronization index as described hereinabove (step 1470); and
  assessing the improvement in the performance of the multi-electrode pacemaker on a basis of the first and second synchronization indices (step 1480). The method then ends at step 1490, or may be performed iteratively until an optimal result is obtained.

Image acquisitions are performed according to methods well-known in the art. Also, setting the activation times for the electrodes is also performed in a conventional manner.

For example, an improvement in the performance of the multi-electrode pacemaker is indicated by an increase in the synchronization index.

Figure 12:
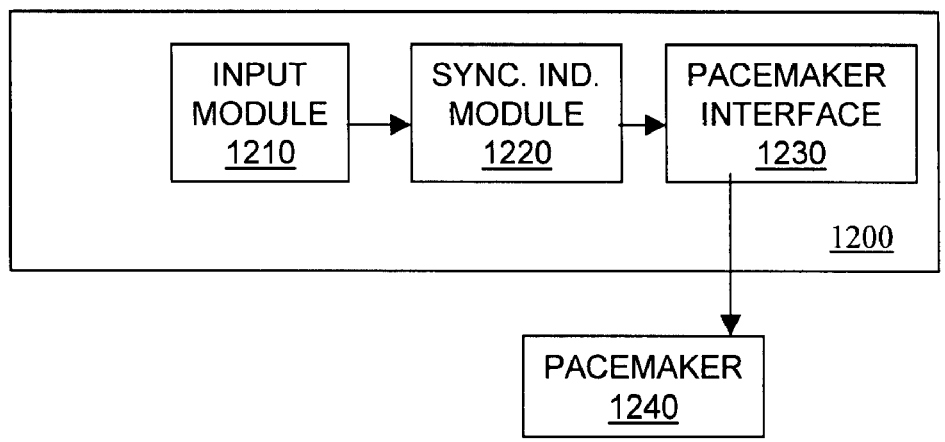
FIG. 12 is a block diagram illustrating a device for changing operational characteristics of a multi-electrode pacemaker.

A device 1200 using the synchronization index is also shown in FIG. 12. The device 1200 is usable for changing electrode activation times in a multi-electrode pacemaker 1240. The multi-electrode pacemaker 1240 includes at least two electrodes implanted in a heart of a patient, each of the electrodes being activatable at a respective time in the cardiac cycle.

The device 1200 includes a synchronization index evaluation module 1220 for computing a synchronization index for the cardiac chamber and a pacemaker interface module 1230 for interfacing with the multi-electrode pacemaker 1240 and sending control signals to the pacemaker for setting activation times for each of the electrodes, the pacemaker interface module 1240 being operatively coupled to the synchronization module 1230 for setting activation times for each of the electrodes on a basis of the synchronization index. In some embodiments of the invention, the device 1200 includes an input module 1210 for receiving the tri-dimensional images. However, in alternative embodiments, the device 1200 is directly capable of acquiring the images. The synchronization index evaluation module 1220 allows assessing the contraction synchronization of the heart and the pacemaker interface module 1230 allows for modifying the electrode activation time on a basis of the synchronization index so as to optimize the contraction synchronization of the heart. In some embodiments, the synchronization index evaluation module 1220 includes a user output for providing the computed synchronization index to an intended user, and the pacemaker interface module 1230 includes an input interface for receiving control commands from the intended user, the control commands being indicative of the activation times to be set for each of the electrodes. In alternative embodiments, the activation times to be set for each of the electrodes are set automatically according to a predetermined activation time selection method, such methods being known in the art.

In the devices 1100 and 1200, the various modules are implementable using software, hardware, or a combination of software and hardware. These devices 1100 and 1200 are described in schematic modular form to better explain their functionality, but this modular description should not be interpreted as requiring that each of the modules be physically distinct, or be implemented in a different software module.

EXAMPLE

A specific embodiment of the above-described method for assessing the contraction synchronization of a heart of a patient is described hereinbelow and compared to prior art methods.

Materials and Methods

Study Population

The study population consisted of consecutive patients referred to the nuclear medicine department of the Montreal Heart Institute for assessment of left ventricular systolic function between June 2004 and June 2006. Patients hospitalized for an acute event or with decompensated heart failure were excluded. Data regarding baseline variables and past medical history were recorded and both planar and GBP-SPECT acquisition performed. The protocol was approved by the Montreal Heart Institute's research and ethic committee.

Labeling Technique

Labeling of autologous red-blood cells was performed using the usual in vivo technique with intravenous administration of 1110 MBq of $^{99m}$technetium. Cold stannous pyrophosphate (Amerscan™, Amersham Health; Piscataway, N.J.) was injected 20 minutes prior to technetium.

Planar Acquisition

Planar equilibrium ECG-gated radionuclide angiography was performed in the left anterior oblique projection to optimize septal separation of the right ventricle (RV) from the left ventricle (LV). Clinical images were acquired on a planar gamma camera (Scintronix, Livingston, England) with appropriate caudal tilt. A low-energy, high-resolution collimator was used for acquisition, with a 20% energy window centered on 140 keV. Images were acquired as 64×64 matrices at 5.33 mm/pixel and acquisition was gated using a 20% temporal window manually centered using the R-R histogram and 16 bins. The quality of planar images was controlled while ensuring a LV count density greater than 500 counts/ $cm^2$/frames on the best-septal view.

Planar-GBP images were processed using commercially available software (Picker Corporation, Cleveland, Ohio; version FX 8.9C). For assessment of LV ejection fraction (LVEF), an operator outlined LV contours at end systole and diastole, guided by a visual impression of LV shape and assisted by Fourier amplitude and phase maps. For all other time intervals in the complete planar-GBP study, automated algorithms generated regions based on end-diastolic and end-systolic limits. Mean phase angle and planar heterogeneity indices were computed, with the latter defined as the standard deviation of the phase signal within the LV region. As the planar software uses a sine rather than cosine function to perform harmonic analyses, we factored in a 90-degree constant to all planar mean phases in order to compare 3D and planar methodologies.

GBP-SPECT Data Acquisition

Immediately following planar-GBP image acquisition, all patients underwent GBP-SPECT. A triple-head gamma camera (Prism 3000S, Picker Corporation, Cleveland, Ohio) was used to collect images in 63 projections over a 360° ellipsoidal arc. With a low-energy high-resolution collimator, 64 by 64 tomograms with a pixel size of 5.32 mm were acquired per projection for 45 accepted cycles. Tomograms were acquired at rest, with 16 frames per R-R interval and a 20% R-wave window. The quality of each acquisition was further controlled while ensuring a count density greater than 100 counts/$cm^2$/frame in the three projections with the LV in the best septal position.

All data sets were reviewed for potential imaging artifacts. Ramp filtering transaxial reconstructions were performed followed by 3D filtering with a Butterworth order-5 filter. Frequency cutoffs were selected with the aid of a power spectrum graph to remove all frequencies with a signal-to-noise ratio less than 10%. Images were reoriented into short-axis sections by manually selecting LV symmetry axes. Segmentation of short-axis slices were performed with in-house software using a technique based on invariance of the Laplacian, as described hereinabove. For each vertex of the LV surface in motion, two parameters were analyzed: amplitude and phase (or delay) of contraction. A third parameter, contraction efficiency, was derived from these values. Contraction efficiency of a vertex is the proportion of its contraction amplitude that is in phase with the remainder of the ventricle. Thus, efficiency is negative if this phase differs from the mean phase for more than a quarter of the cardiac cycle. The contraction homogeneity index (CHI) constitutes a transformation of the ratio between wall movement contributing to stroke volume and total wall movement. CHI, therefore, relates the ratio of mean efficiency to mean amplitude.

More specifically, a set of points, for example angularly substantially equally spaced points or randomly selected points, are selected on the surface of the LV at a given time. To compute the CHI, a normal vector is computed for each point for the set of points and movement of the surface of the LV as a function of time is obtained along each normal vector. Each of these movements as a function of time is Fourier transformed and the complex first harmonic above DC is extracted. Then, the mean efficiency $\bar{E}$ is computed by taking the modulus of the average complex first harmonic Fourier coefficients above DC. In other words, the complex Fourier coefficients obtained for each Fourier transformed normal motion of the surface of the LV are averaged. The CHI is computed by normalizing this quantity relatively to $\overline{A}$, the mean amplitude of ventricular wall movements, represented by the average of the moduli of the complex first harmonic Fourier coefficients above DC. Therefore:

$$CHI \propto \frac{\overline{E}}{\overline{A}}$$

Statistical Analysis

Statistical analyses were performed using GraphPad Prism (version 4.03 for Windows, GraphPad Software, San Diego, Calif.). Continuous normally distributed variables were expressed as mean±SD. Dispersion indices had non-Gaussian distributions and were presented as median and interquartile range ($25^{th}$, $75^{th}$ percentile). Mean phases were compared using paired t-tests. Correlations between planar and tomographic dispersion estimates were made using Spearman coefficients. The relationship between these parameters were explored by non-linear regression analyses based on a translated exponential. A two-tailed P-value <0.05 was considered to indicate statistical significance.

Results

Baseline Characteristics

Overall, 235 patients (79% male), mean age 62±11 years, were recruited and successfully completed the study. The mean body mass index was 27.2±4.6 kg/m². The following risk factors for coronary artery disease were noted: diabetes (n=57), hypertension (n=105), dyslipidemia (n=132), active smoking (n=47), and past history of smoking (n=49).

Left Ventricular Ejection Fraction

Figure 5:
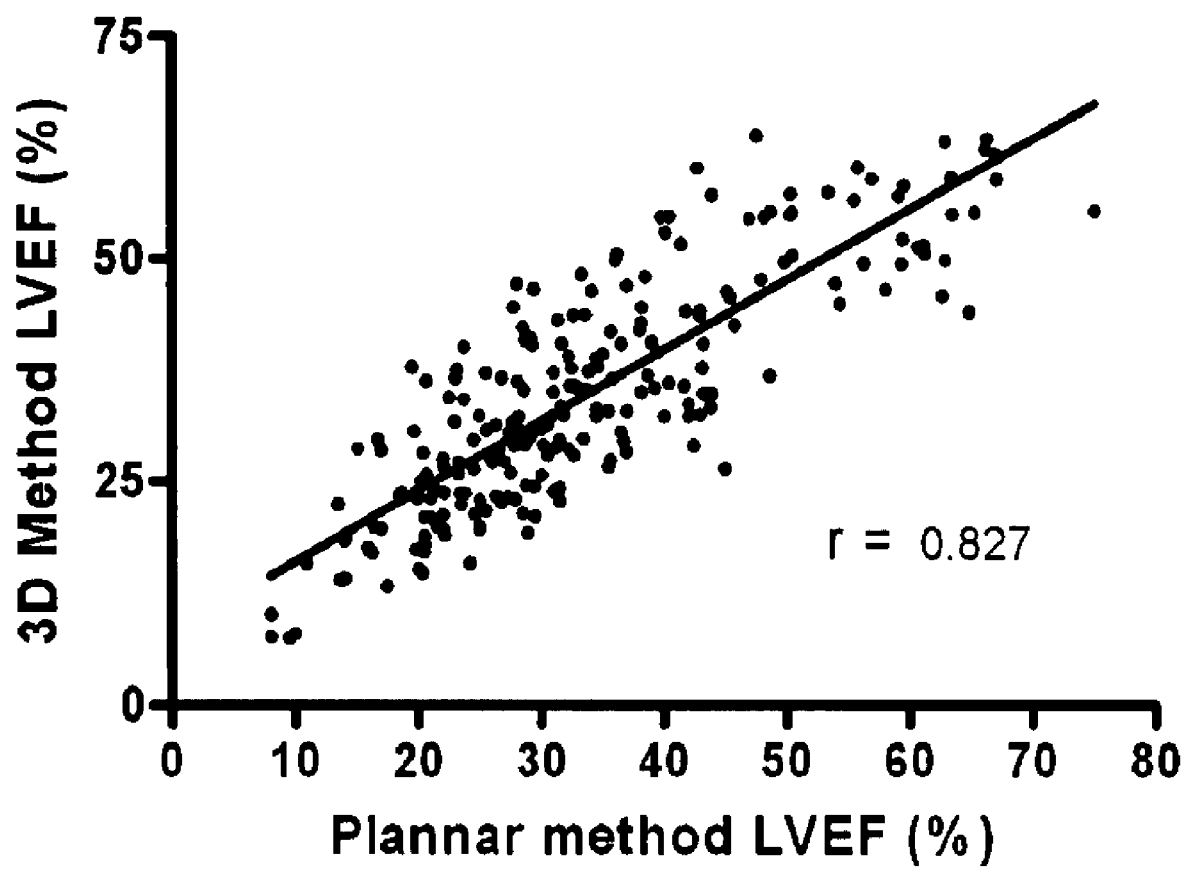
FIG. 5 illustrates a regression analysis showing associations between IL method and planar method for LVEF computation.

By planar methodology, the LVEF ranged from 8% to 75%, with a mean LVEF of 33.5±13.5%. By 3D methodology, the mean LVEF was 34.7±12.7%, which was not statistically significantly different. As depicted in FIG. 5, an excellent correlation was noted between the two methods (r=0.83; P<0.0001).

Phase Angles

Figure 6:
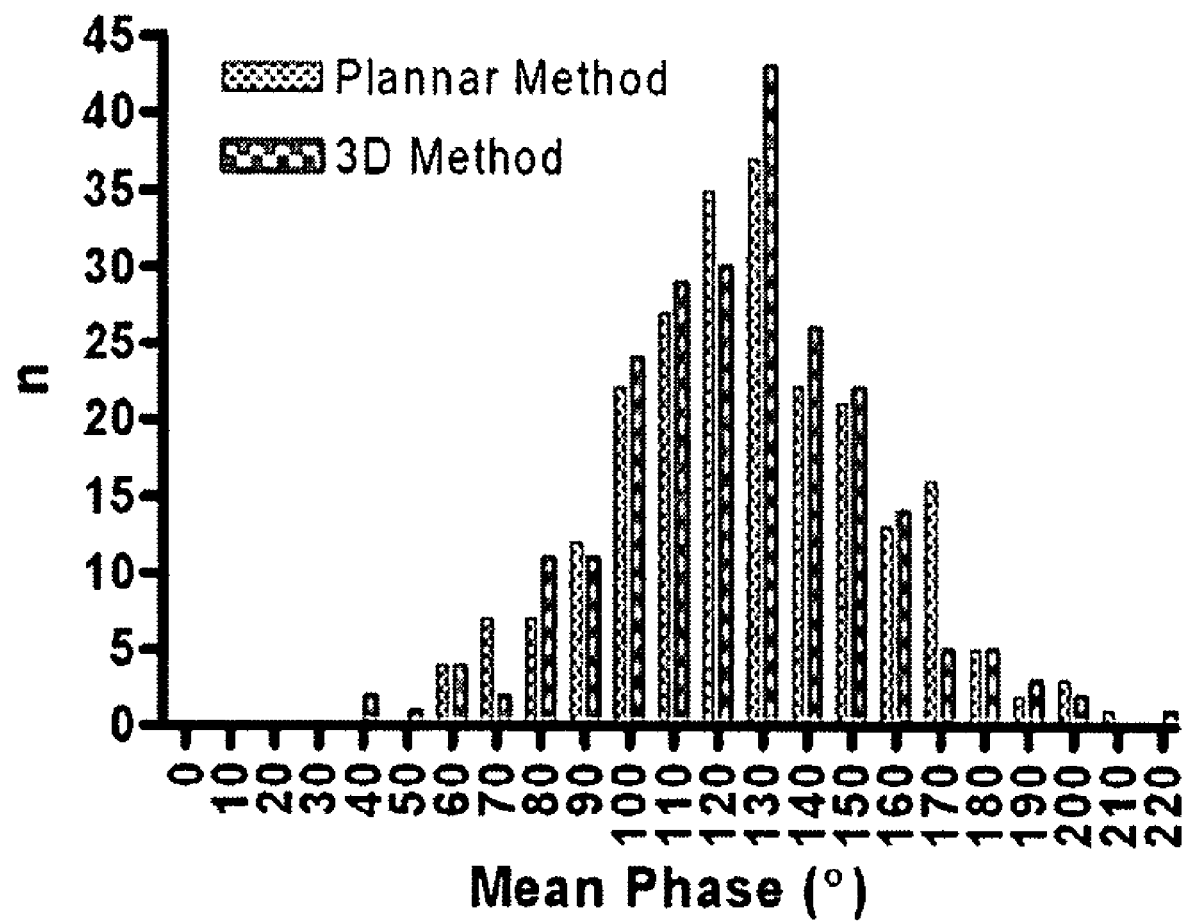
FIG. 6 is a histogram-diagram showing frequency of left ventricular mean phase computed by the IL method and the planar algorithm.
Figure 7:
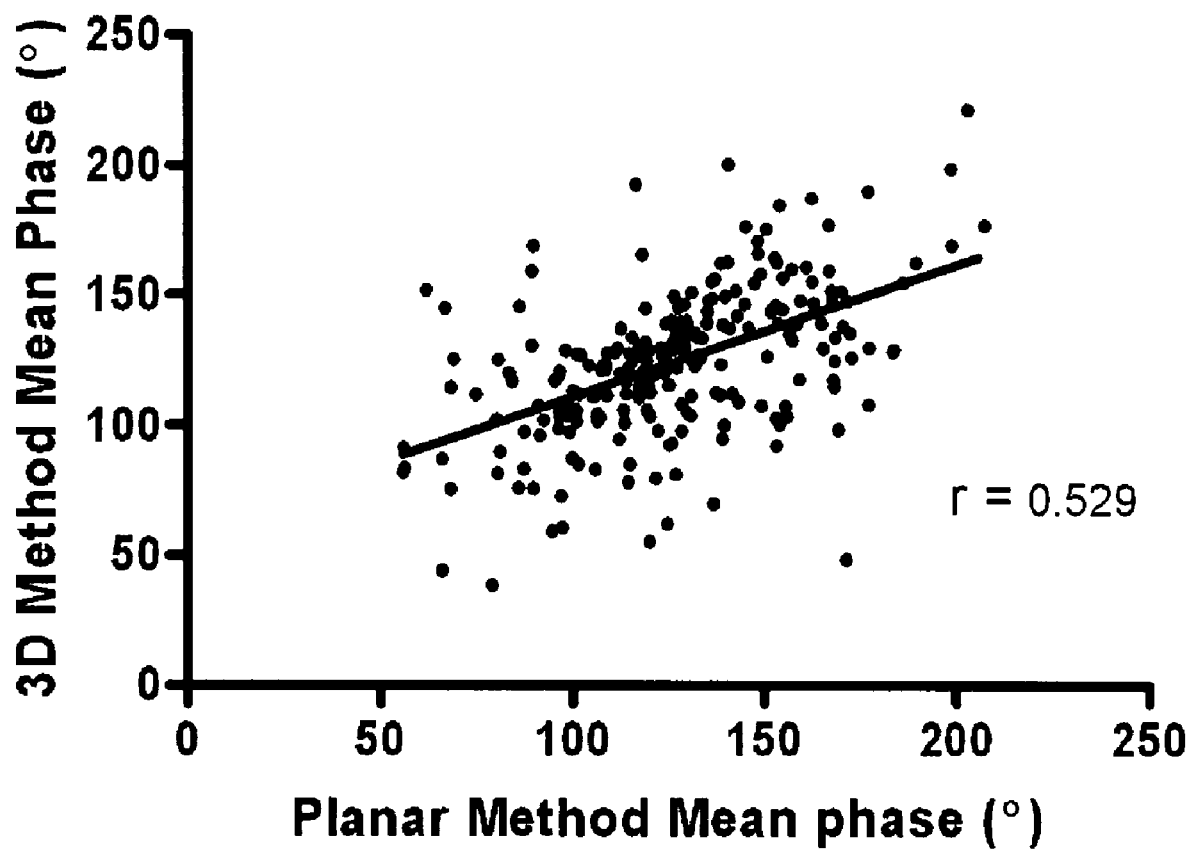
FIG. 7 illustrates a regression analysis showing the correlation for left ventricular mean phase computed by II and planar methods.

Mean phase angles for planar and tomographic methods were 126.3±29.6° and 124.4±28.7°, respectively, with a moderate correlation between the two (r=0.53; p<0.0001), as illustrated in FIGS. 6 and 7.

Contraction Homogeneity Index and Heterogeneity Index

Figure 8:
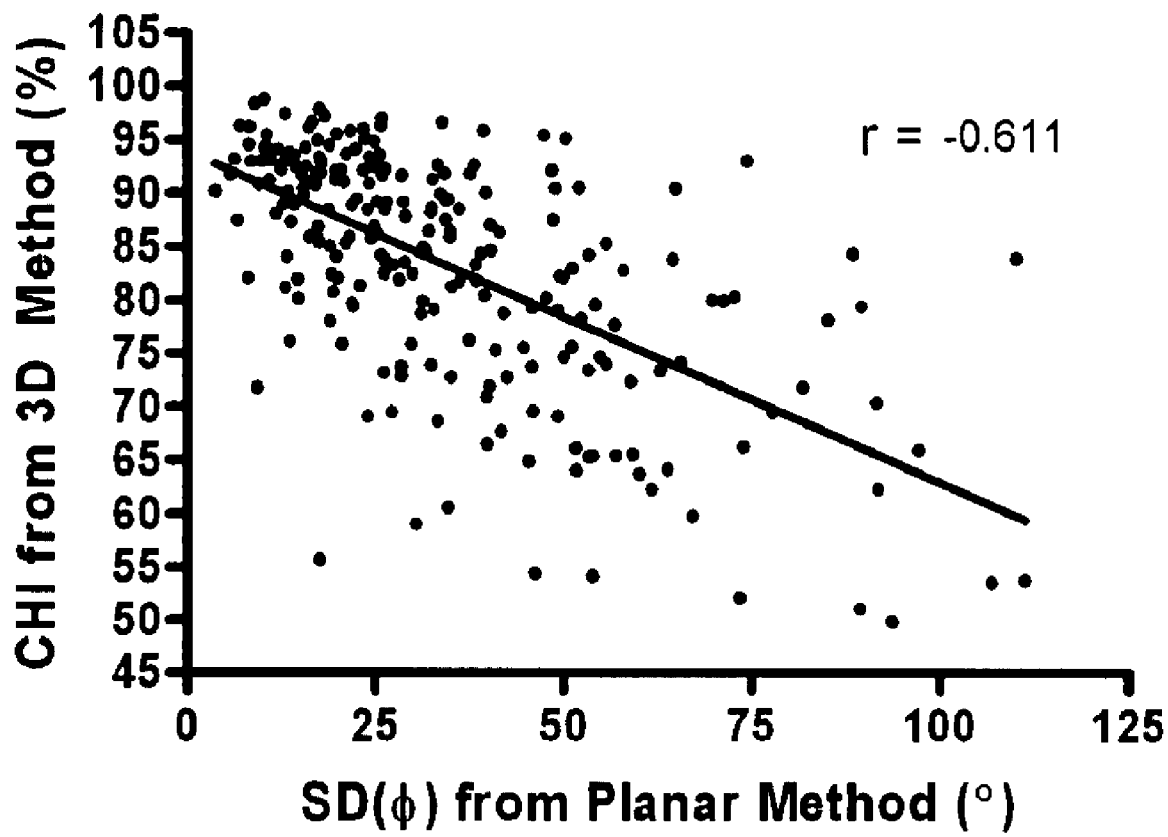
FIG. 8 is a scatter plot with regression analysis of the dispersion index.
Figure 9:
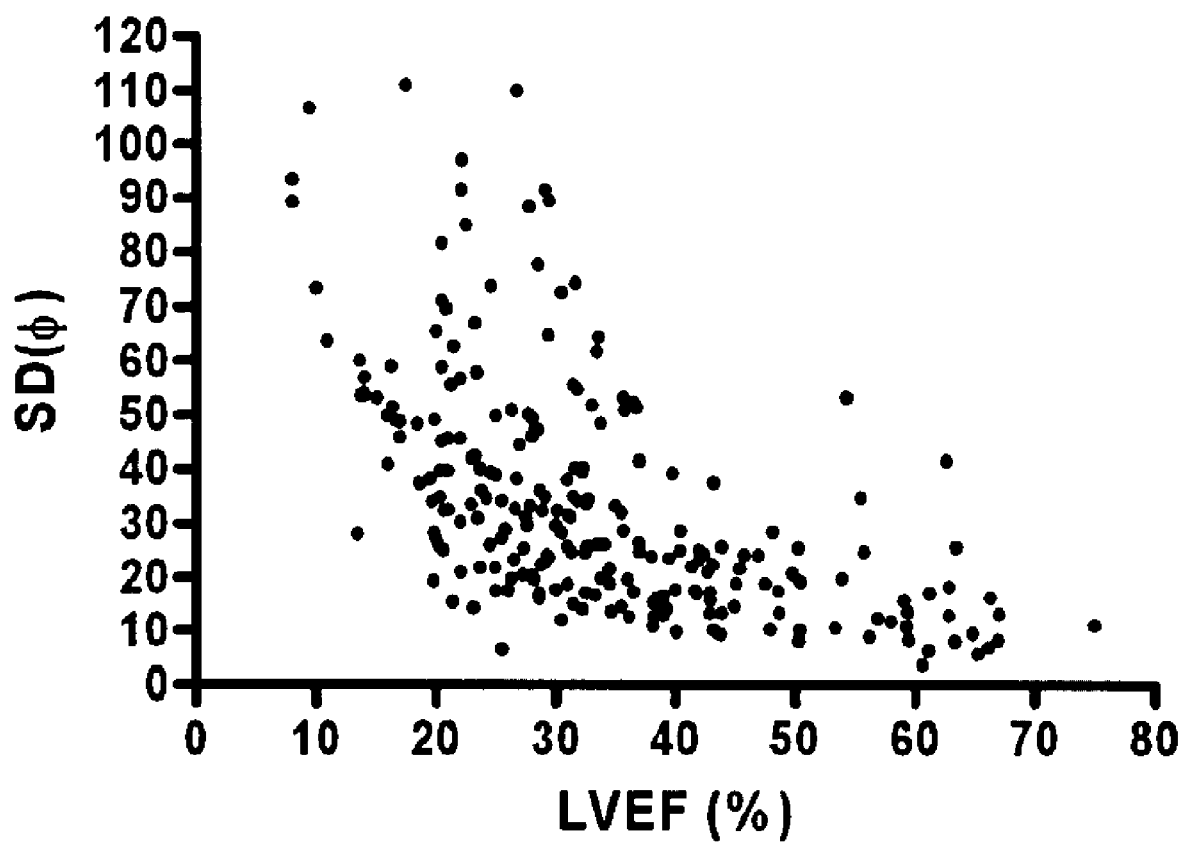
FIG. 9 is a scatter plot showing the relation between the planar dispersion index (SD($\Phi$)) and the left ventricular ejection fraction (LVEF)

Phase and amplitude signals were incorporated in the CHI, which had a median value of 85.9% (77.7%, 92.2%). FIG. 8 exemplifies the concept of regional ventricular efficiency and its relationship to wall motion amplitude and phase. The amplitude of the out-of-phase septal wall movement modulates the deleterious effect on global ventricular function. The negative impact of a dyskinetic wall segment is minimized if regional motion is limited.

Figure 10:
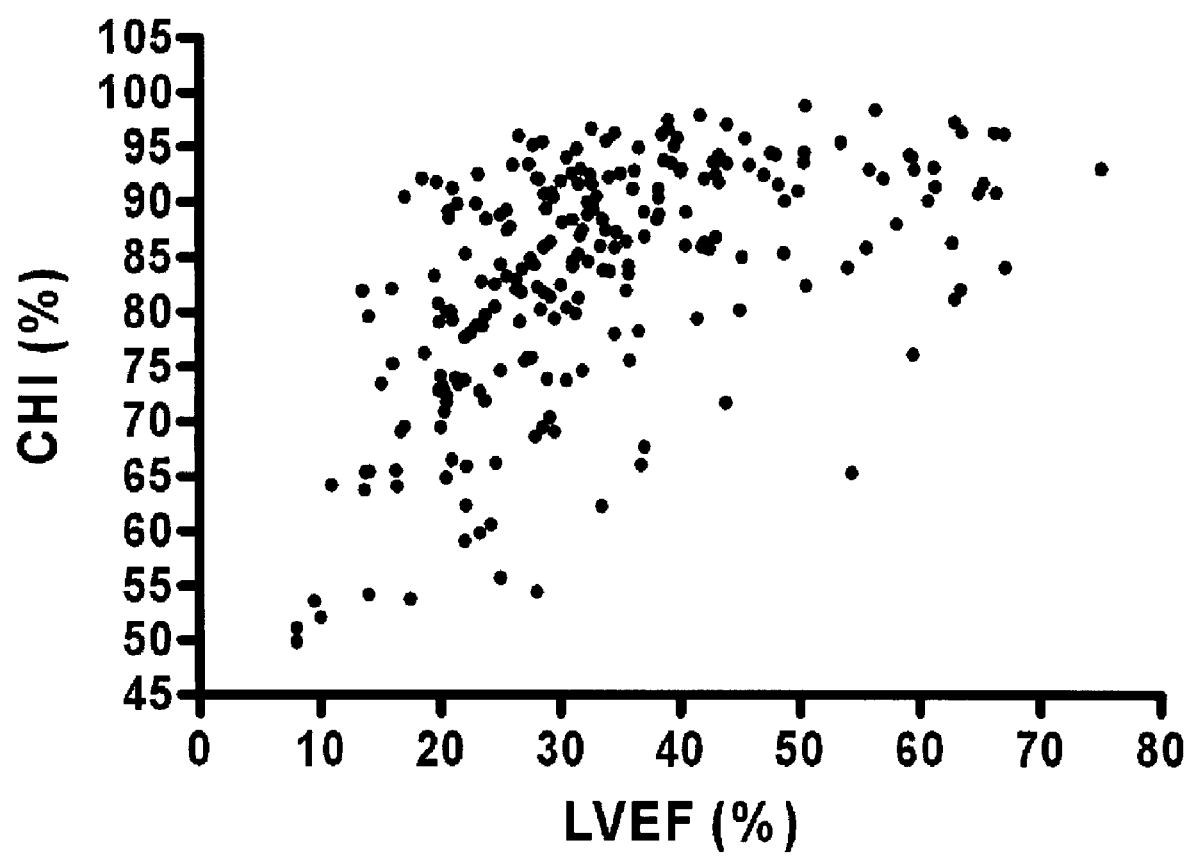
FIG. 10 is a scatter plot showing relation between a 3D dispersion index (CHI) and the LVEF.

The planar heterogeneity index (sdΦ) was 28.2° (17.5°, 46.8°), which inversely correlated with CHI (r=−0.61, P<0.0001), as graphically displayed in FIG. 8. In further analyses, these dispersion indices were compared to LVEF. In planar mode, an inverse relationship between dispersion index and LVEF was observed, depicted in FIG. 10. In contrast, a positive correlation between dispersion index and LVEF was noted using the 3D method, illustrated in FIG. 10. In both instances, visual inspection of the graphs revealed a non-linear relationship between dispersion index and LVEF. LVEF remained proportional to CHI until a plateau was reached, after which no further increase in CHI was observed.

Discussion

Cardiac resynchronization therapy (CRT) is a relatively new treatment modality for patients with symptomatic heart failure resulting from systolic dysfunction. By simultaneously pacing both left and right ventricles in selected patients, the timing of global left ventricular depolarization is synchronized, with improvements in mechanical contractility and mitral regurgitation. Early studies with CRT demonstrated its ability to improve symptoms, exercise capacity, and well-being of many patients with moderate to severe heart failure. Other studies demonstrated the capacity for CRT to reduce left ventricular dilation and improve energy efficiency. Beneficial effects were borne out by large-scale randomized clinical trials. In eligible candidates, the COMPANION study demonstrated a reduction in hospitalizations[5] and CARE-HF documented a survival benefit.[6]

QRS duration has traditionally been used as an electrical marker of asynchrony and remains an inclusion criterion in many trials.[7] Nevertheless, several studies have noted that magnitude of mechanical dyssynchrony is a more powerful predictor of ventricular function and response to CRT than QRS duration.[8] There is, therefore, much interest in developing a simple means of providing accurate and reproducible indices of cardiac dyssynchrony. In this study, we present the theoretical concept of ventricular contraction efficiency as a 3D parameter with potential to better quantify the impact of dyssynchrony on ventricular function.

On a practical level, the CHI can serve as a single parameter that reflects global homogeneity of left ventricular contraction. The concept of contraction efficiency considers the magnitude of effect of specific wall motion abnormalities, factoring in the notion that the impact of an asynchronous wall motion relates not only to phase contraction delay but also to the amplitude of this delayed motion. An asynchronous segment of small amplitude has a lesser effect on global ventricular efficiency than asynchronous wall motion of greater amplitude.

This concept overcomes some limitations of standard planar imaging, as a two-dimensional representation provides only partial estimates of true synchrony. Indeed, in the best-septal view, it is difficult to adequately assess anterior and inferior wall motion, as the borders are not clearly visible. Moreover, all incidences provide partial information and may be considered incomplete.

In the current study, we found a correlation between LVEF and global ventricular synchrony computed by both planar and 3D methodology. LVEF remained proportional to CHI until a plateau was reached (see FIG. 12). It is hypothesized that this point of deflection represents optimal synchrony and further increases in LVEF must be accounted for by other factors. Moreover, presence of dyssynchrony does not necessarily imply a low LVEF. Conversely, a severely reduced LVEF does not inexorably generate substantial dyssynchrony, since hypokinesia may be homogeneous.

Fourier analysis was previously used to characterize conduction abnormalities[9-11] and quantify cardiac wall motion with planar imaging.[12-15] Muramatsu et al. more recently applied Fourier analysis to blood-pool SPECT imaging in assessing indications for CRT.[16] However, the transformation was applied directly to blood-pool images without segmentation and phase rather than efficiency criteria were employed. O'Connell also reported phase and amplitude signals with planar imaging in a limited number of patients.[17] Casset-Senon et al. applied Fourier analysis to SPECT data using a first harmonic model on a thick-slice blood-pool model without segmentation.[18] In the absence of prior segmentation, the amplitude of the Fourier signal on the endocardial border was related to variations in blood-pool intensity. In contrast, when we applied Fourier analysis to leading-edge detected points, amplitude signals were related to quantity of blood motion, which more directly and appropriately characterizes the physiological process.

In the absence of a "gold-standard", it is difficult to quantify true accuracy of the proposed technique. Sensitivity of the standard deviation of the LV phase by planar methodology has been previously assessed to detect segmental wall motion abnormalities.[15] This parameter independently predicted major cardiac events in patients with idiopathic dilated cardiomyopathy.[19] Other investigators have relied on planar estimates to predict response to CRT.[8] Our 3D assessment correlates reasonably well with planar mode values. It should be noted that a less than perfect correlation is an advantage, given that full concordance would suggest a technique no better than its flawed counterpart.

It is believed that the proposed CHI approach using SPECT-gated blood-pool imaging offers several advantages over current methodology. Firstly, 3D quantification of ventricular synchrony overcomes inherent inaccuracies from two-dimensional imaging. Secondly, automated data-processing results in reductions in variability for repeated measures. Thirdly, reliability of segmentation allows more precise definition of ventricular chambers, removing distorting effects from atrial contamination. Fourthly, the effectiveness parameter overcomes difficulties arising from indeterminant phase imaging in the presence of akinesia or severe hypokinesia. Moreover, this novel parameter is intuitively appealing, as it incorporates the pathophysiologic concept that high amplitude out-of-phase contraction generates more deleterious effects on total ventricular dynamics and ejection volume than comparatively smaller out-of-phase hypokinesia. In comparison to echocardiographic indices, our proposed method is more expedient as all processing is performed by computer software with data in 4D format (3D+time). Finally, in keeping with the principle of parsimony, the mathematical equation remains simplistic and interpretable physiologically.

CONCLUSIONS

We described a novel technique to assess ventricular dyssynchrony by means of 3D gated SPECT blood-pool imaging. This approach quantifies ventricular contraction efficiency and computes an intuitive contraction homogeneity index that considers both the phase delay of a dyssynchronous segment and its magnitude of contraction. Such detailed assessment is thought to better characterize dynamics of ventricular contraction and elucidate the variable impacts of dyssynchronous segments on global ventricular function.

It is hypothesized that alternative indices may also provide good identification of patients for whom CRT is recommended. For example, one could similarly define:
- a Sphericity index SI indicative of the shape of the ventricle; indeed, the left ventricle may be modelled as a parabolloid; some cardiac pathologies, such as for example heart failure, result in the left ventricle getting more spherical as the pathology progresses;
- a time delay in contraction between the septal wall and the peripheral wall of the heart or between the contraction the left and right ventricles;
- the "global" average movement of the heart (in translation, rotation, or both translation and rotation) during contraction.

Although the present invention has been described hereinabove by way of preferred embodiments thereof, it can be modified, without departing from the spirit and nature of the subject invention as defined in the appended claims.

REFERENCES

1. Abraham W T, Fisher W G, Smith A L, Delurgio D B, Leon A R, Loh E, et al, MIRACLE Study Group. Multicenter In Sync Randomized Clinical Evaluation. Cardiac resynchronization in chronic heart failure. N Engl J Med 2002; 346:1845-53.
2. Auricchio A, Kloss M, Trautmann S I, Rodner S, Klein H. Exercise performance following cardiac resynchronization therapy in patients with heart failure and ventricular conduction delay. Am J Cardiol 2002; 89: 198-203.
3. Auricchio A, Stellbrink C, Sack S, Block M, Vogt J, Bakker P, et al, Pacing Therapies in Congestive Heart Failure (PATH-CHF) Study Group. Long-term clinical effect of hemodynamically optimized cardiac resynchronization therapy in patients with heart failure and ventricular conduction delay. J Am Coll Cardiol 2002; 39:2026-33.
4. Cazeau S, Leclercq C, Layergne T, Walker S, Varma C, Linde C, et al, Multisite Stimulation in Cardiomyopathies (MUSTIC) Study Investigators. Effects of multisite biventricular pacing in patients with heart failure and intraventricular conduction delay. N Engl J Med 2001; 344:873-80.
5. Bristow M R, Saxon L A, Boehmer J, Krueger S, Kass D A, De Marco T, et al, Comparison of Medical Therapy, Pacing, and Defibrillation in Heart Failure (COMPANION) Investigators. Cardiac-resynchronization therapy with or without an implantable defibrillator in advanced chronic heart failure. N Engl J Med 2004; 350:2140-50.
6. Cleland J G, Daubert J C, Erdmann E, Freemantle N, Gras D, Kappenberger L, et al, Cardiac Resynchronization-Heart Failure (CARE-HF) Study Investigators. The effect of cardiac resynchronization on morbidity and mortality in heart failure. N Engl J Med 2005; 352:1539-49.
7. Swedberg K, Cleland J, Dargie H, Drexler H, Follath F, Komajda M, et al, Grupo de Trabajo de Diagnostico y Tratamiento de la Insuficiencia Cardiaca Cronica de la Sociedad Europea de Cardiologia; Comite de la ESC para la elaboracion de las Guias de Practica Clinica. [Guidelines for the Diagnosis and Treatment of Chronic Heart Failure: executive summary (update 2005)]. Rev Esp Cardiol 2005; 58:1062-92.
8. Breithardt O A, Stellbrink C, Kramer A P, Sinha A M, Franke A, Salo R, et al, PATH-CHF Study Group. Echocardiographic quantification of left ventricular asynchrony predicts an acute hemodynamic benefit of cardiac resynchronization therapy. J Am Coll Cardiol 2002; 40:536-45.
9. Botvinick E H, Frais M A, Shosa D W, O'Connell J W, Pacheco-Alvarez J A, Scheinman M, et al. An accurate means of detecting and characterizing abnormal patterns of ventricular activation by phase image analysis. Am J Cardiol 1982; 50:289-98.
10. Links J M, Raichlen J S, Wagner H N, Jr., Reid P R. Assessment of the site of ventricular activation by Fourier analysis of gated blood-pool studies. J Nucl Med 1985; 26:27-32.
11. Raichlen J S, Links J M, Reid P R. Effect of electrical activation site on left ventricular performance in ventricular tachycardia patients with coronary heart disease. Am J Cardiol 1985; 55:84-8.

12. Botvinick E, Dunn R, Frais M, O'Connell W, Shosa D, Herfkens R, et al. The phase image: its relationship to patterns of contraction and conduction. Circulation 1982; 65:551-60.
13. Brateman L, Buckley K, Keim S G, Wargovich T J, Williams C M. Left ventricular regional wall motion assessment by radionuclide ventriculography: a comparison of cine display with Fourier imaging. J Nucl Med 1991; 32:777-82.
14. Mancini G B, Peck W W, Slushy R A. Analysis of phase-angle histograms from equilibrium radionuclide studies: correlation with semi quantitative grading of wall motion. Am J Cardiol 1985; 55:535-40.
15. Voss P H, Gossypol A M, Pawls E K. Quantitative assessment of wall motion in multiple-gated studies using temporal Fourier analysis. J Nucl Med 1983; 24:388-96.
16. Muramatsu T, Matsumoto K, Nishimura S. Efficacy of the phase images in Fourier analysis using gated cardiac POOL-SPECT for determining the indication for cardiac resynchronization therapy. Circ J 2005; 69: 1521-6.
17. O'Connell J W, Schreck C, Moles M, Badwar N, DeMarco T, Olgin J, et al. A unique method by which to quantitate synchrony with equilibrium radionuclide angiography. J Nucl Cardiol 2005; 12:441-50.
18. Casset-Senon D, Babuty D, Philippe L, Fauchier L, Eder V, Fauchier J P, et al. Fourier phase analysis of SPECT equilibrium radionuclide angiography in symptomatic patients with mitral valve prolapse without significant mitral regurgitation: assessment of biventricular functional abnormalities suggesting a cardiomyopathy. J Nucl Cardiol 2000; 7:471-7.
19. Fauchier L, Marie O, Casset-Senon D, Babuty D, Cosnay P, Fauchier J P. Interventricular and intraventricular dyssynchrony in idiopathic dilated cardiomyopathy: a prognostic study with fourier phase analysis of radionuclide angioscintigraphy. J Am Coll Cardiol 2002; 40:2022-30.
20. Van Kriekinge et al., "Automatic quantification of left ventricular ejection fraction from gated blood pool SPECT", Journal of Nuclear Cardiology, 1999, Vol. 6, pp 498-506.
21. U.S. Pat. No. 6,389,310 issued to Demonceau et al. on May 14, 2002 and titled "Method and apparatus for analyzing heart function using 4D ECG synchronized heart cavity tomoscintigraphy".

What is claimed is:

1. A method for assessing the contraction synchronization of a heart of a patient using a set of tridimensional images of said heart, said heart having a contraction cycle, said set of tridimensional images including tridimensional images of said heart acquired at successive phases in said contraction cycle, said heart defining a cardiac chamber, said cardiac chamber defining a chamber surface, said method comprising:

segmenting said sequence of tridimensional images to extract a model of an evolution over time of the configuration of said chamber surface;

computing a synchronization index for said cardiac chamber using said model of said evolution over time of said configuration of said chamber surface, said synchronization index being indicative of the contraction synchronization of the movements of said chamber surface during said contraction cycle; and assessing said contraction synchronization of said heart based on said contraction index.

2. A method as defined in claim 1, wherein segmenting said sequence of tridimensional images includes computing a sequence of modeled chamber surfaces from said set of tridimensional images of said heart.

3. A method as defined in claim 2, wherein computing said synchronization index includes:

selecting an initial configuration of said cardiac chamber;

selecting a set of chamber surface locations in said initial configuration of said cardiac chamber;

computing an evolution over time of said set of chamber surface locations on a basis of said sequence of modeled chamber surfaces to obtain a set of chamber surface time evolutions, each of said chamber surface time evolutions corresponding to a respective chamber surface location from said set of chamber surface locations; and computing said synchronization index on a basis of said set of chamber surface time evolutions.

4. A method as defined in claim 3, wherein said initial configuration of said cardiac chamber is a modeled chamber surface selected from said sequence of modeled chamber surfaces.

5. A method as defined in claim 3, wherein computing said evolution over time of said set of chamber surface locations includes computing said evolution over time of said set of chamber surface locations along a direction substantially perpendicular to said initial configuration of said cardiac chamber for each of said chamber surface locations.

6. A method as defined in claim 3, wherein said synchronization index is proportional to a modulus of an average of the complex first harmonic coefficients of a Fourier transform of said evolution over time of said chamber surface locations.

7. A method as defined in claim 6, wherein said synchronization index is normalized to an average of the moduli of said first harmonic coefficients of said Fourier transform of said evolution over time of said chamber surface locations.

8. A method as defined in claim 1, wherein segmenting said sequence of tridimensional images includes:

selecting a region of interest in said set of tridimensional images, said region of interest representing a region of said heart including said cardiac chamber;

computing an approximative model of said chamber surface on a basis of said region of interest using a non-parametric method, said approximative model of the surface of interest including a plurality of surface coordinates;

computing a plurality of normal vectors, each normal vector being associated with a respective surface coordinate from said approximative model of the surface of interest;

computing a plurality of biopsy data sets, each biopsy data set including a plurality of data points, each biopsy data set being representative of a straight segment oriented in a direction defined by a respective normal vector selected from said plurality of normal vectors and including surface coordinates associated with said respective normal vector; and computing an exact model of at least a portion of said cardiac chamber on a basis of the plurality of biopsy data sets, said exact model of said portion of the surface of interest including a plurality of surface coordinates, said exact model of said portion of said surface of interest being computed by expanding locally said approximative model of said surface of interest in directions defined by said plurality of normal vectors, said model of said evolution over time of said configuration of said chamber surface including said exact model.

9. A method as defined in claim 1, wherein said cardiac chamber is a ventricle.

10. A method as defined in claim 1, wherein said sequence of tridimensional images of said heart is a sequence of gated blood-pool tridimensional images.

11. A method as defined in claim 1, wherein assessing said contraction synchronization of said heart based on said contraction index includes classifying said patient in a predetermined category according to a set predetermined criteria.

12. A method for assessing an improvement in performance of a multi-electrode pacemaker, said multi-electrode pacemaker including at least two electrodes implanted in a heart of a patient, each of said electrodes being activatable at a respective activation time in a cardiac cycle, said heart defining a cardiac chamber, said method comprising:

setting respective first activation times for each of said electrodes;

acquiring a first set of tridimensional images of said heart after having set said respective first activation times, said first set of tridimensional images including tridimensional images of said heart acquired at successive phases in said contraction cycle;

computing a first synchronization index according to the method of claim 1 using said first set of tridimensional images of said heart;

setting respective second activation times for each of said electrodes;

acquiring a second set of tridimensional images of said heart after having set said respective second activation times, said second set of tridimensional images including tridimensional images of said heart acquired at successive phases in said contraction cycle;

computing a second synchronization index according to the method of claim 1 using said second set of tridimensional images of said heart; and assessing said improvement in said performance of said multi-electrode pacemaker on a basis of said first and second synchronization indices.

13. A method as defined in claim 12, wherein an improvement in said performance of said multi-electrode pacemaker is indicated by an increase in said synchronization index.

* * * * *